United States Patent
Zhang

(10) Patent No.: US 11,093,108 B2
(45) Date of Patent: Aug. 17, 2021

(54) METHOD FOR DISPLAYING USER INTERFACE AND DISPLAY DEVICE

(71) Applicant: QINGDAO HISENSE MEDIA NETWORKS LTD., Shandong (CN)

(72) Inventor: Xin Zhang, Shandong (CN)

(73) Assignee: Qingdao Hisense Media Networks Ltd., Qingdao (CN)

( * ) Notice: Subject to any disclaimer, the term of this patent is extended or adjusted under 35 U.S.C. 154(b) by 0 days.

(21) Appl. No.: 16/994,872

(22) Filed: Aug. 17, 2020

(65) Prior Publication Data

US 2021/0011609 A1    Jan. 14, 2021

Related U.S. Application Data

(63) Continuation of application No. PCT/CN2020/072447, filed on Jan. 16, 2020.

(30) Foreign Application Priority Data

Jul. 12, 2019    (CN) .......................... 201910632023.7

(51) Int. Cl.
*G06F 3/048* (2013.01)
*G06F 3/0481* (2013.01)
(Continued)

(52) U.S. Cl.
CPC ........ *G06F 3/04817* (2013.01); *G06F 3/0483* (2013.01); *G06F 3/04842* (2013.01); *G06F 9/451* (2018.02); *G06F 16/986* (2019.01)

(58) Field of Classification Search
CPC .. G06F 3/04817; G06F 9/451; G06F 3/04842; G06F 3/0483; G06F 16/986; G06F 3/048
See application file for complete search history.

(56) References Cited

U.S. PATENT DOCUMENTS

2006/0268100 A1    11/2006    Karukka et al.
2007/0288868 A1    12/2007    Rhee et al.
(Continued)

FOREIGN PATENT DOCUMENTS

CN    101087459 A    12/2007
CN    101960479 A    1/2011
(Continued)

OTHER PUBLICATIONS

ISA State Intellectual Property Office of the People's Republic of China, International Search Report Issued in Application No. PCT/CN2020/072447, dated Apr. 8, 2020, WIPO, 4 pages.
(Continued)

*Primary Examiner* — Jeanette J Parker

(57) ABSTRACT

The present application provides a display device, including: a display configured to display a user interface including view display areas and a focus object, wherein each view display area includes one or more items; a memory configured to store computer instructions; and a processor configured to execute computer instructions to cause the display device to perform operations. The operations include: displaying the user interface on the display; receiving a user input for moving the focus object; and moving a target item to a position where the focus object is; where in response to a number of the one or more items in the view display area being greater than a maximum number of items displayable on a screen of the display, the one or more items are displayed in a fixed focus cycling mode; and otherwise, the one or more items are displayed in a fixed focus non-cycling mode.

13 Claims, 22 Drawing Sheets

(51) Int. Cl.
*G06F 9/451* (2018.01)
*G06F 3/0484* (2013.01)
*G06F 3/0483* (2013.01)
*G06F 16/958* (2019.01)

(56) References Cited

U.S. PATENT DOCUMENTS

| | | | |
|---|---|---|---|
| 2008/0215985 A1* | 9/2008 | Batchelder | G06F 40/103 715/731 |
| 2011/0107209 A1* | 5/2011 | Ha | G06F 3/0488 715/702 |
| 2011/0179388 A1* | 7/2011 | Fleizach | G06F 3/04883 715/840 |
| 2013/0106914 A1* | 5/2013 | Jain | G09G 5/34 345/666 |
| 2015/0370456 A1* | 12/2015 | Kobayashi | A63F 13/23 463/33 |
| 2016/0162181 A1 | 6/2016 | Xu et al. | |
| 2016/0196016 A1* | 7/2016 | Shim | G06F 3/04847 715/828 |
| 2020/0304863 A1* | 9/2020 | Domm | H04H 20/38 |

FOREIGN PATENT DOCUMENTS

| | | |
|---|---|---|
| CN | 103546818 A | 1/2014 |
| CN | 103677628 A | 3/2014 |
| CN | 105117287 A | 12/2015 |
| CN | 105578236 A | 5/2016 |
| CN | 105847930 A | 8/2016 |
| CN | 107704098 A | 2/2018 |
| CN | 108153566 A | 6/2018 |
| CN | 109254706 A | 1/2019 |
| CN | 109618206 A | 4/2019 |
| CN | 109893852 A | 6/2019 |
| CN | 109960556 A | 7/2019 |

OTHER PUBLICATIONS

State Intellectual Property Office of the People's Republic of China, Office Action with English abstract and Search Report Issued in Application No. 2019106320237, dated Feb. 1, 2021, 15 pages.

Meng Xiao, "Based on the Mobile Equipment Web Interface Design and Implementation", China Master's Theses Full-text Database, May 15, 2017, with English abstract, 127 pages.

* cited by examiner

S1401 Determine the target item based on the user input and a current item corresponding to the focus object S1402 Based on space between the target item and the current item, control an outer box to move a corresponding distance in a direction opposite to a movement direction of the focus object

METHOD FOR DISPLAYING USER INTERFACE AND DISPLAY DEVICE

CROSS-REFERENCE TO RELATED APPLICATIONS

This application is a continuation application of International Patent Application No. PCT/CN2020/072447, filed on Jan. 16, 2020, which claims priority to Chinese patent application No. 201910632023.7, entitled "METHOD FOR DISPLAYING USER INTERFACE AND DISPLAY DEVICE," filed on Jul. 12, 2019, the entire contents of which are incorporated herein by reference.

TECHNICAL FIELD

The present application relates to display technologies, and in particular, to a method for displaying a user interface and a display device.

BACKGROUND

In related art, a display device may provide several different applications such as a live broadcast application, a video on demand (VOD) application, and a media center application. Moreover, with the continuous development of technology, the display device may provide more and more applications.

FIG. 1 is a schematic diagram illustrating a typical home page interface of a display device in the related art. As shown in FIG. 1, in order to present various applications to users, two navigation bars and one main page are presented in the home page interface of the display device. A first navigation bar at the top is often used to provide some uncommon functions such as search and clock as well as settings for various functions of the display device. A second navigation bar in a second row shows main application options of the display device. A main page in a third row shows a part or all of items corresponding to respective application options in the second navigation bar, and the items may include function icons, thumbnails, video clips, etc. Upon the home page interface, a user may control movement of a focus object on the home page interface via a control device, for example, a remote control, to select or control the application options and items. For example, in a case where the focus object is located in the second navigation bar, each time the user presses a right navigation button on the remote control, the focus object may be moved towards right once, until it is moved to an application option at the end of this row, i.e., the right-most option of the second navigation bar. In a case where the focus object is the application option at the end of the second navigation bar, when the user wants to select an application option at an initial position, he/she needs to press a left navigation button on the remote control many times until the focus object reaches a desired location.

Apparently, the above-described display mode of the home page interface will bring inconvenience to user's selection operations. Especially when the number of items in each row of the page is large, it may take a long time for the user to move the focus object to the desired location, thereby affecting user experience.

SUMMARY

Examples of the present application provide a method for displaying a user interface and a display device, so that a user may reduce user operations when selecting a focus object.

In one aspect, a display device is provided. The display device includes: a display, a memory and a processor. The display is configured to display a user interface, wherein the user interface includes a plurality of view display areas, each of the view display areas includes one or more items, and the user interface further includes a focus object indicating that one of the one or more items is selected. The memory is configured to store computer instructions. The processor in communication with the display, and configured to execute the computer instructions to cause the display device to perform: displaying the user interface on the display; and upon receiving a user input for moving the focus object in a view display area of the view display areas, moving a target item to a position where the focus object is by: in response to a number of the one or more items in the view display area being greater than a maximum number of items displayable within a display range of the view display area on a screen of the display, displaying the one or more items in the view display area in a fixed focus cycling mode; and in response to the number of the one or more items in the view display area being less than or equal to the maximum number of the items displayable within the display range of the view display area on the screen of the display, displaying the one or more items in the view display area in a fixed focus non-cycling mode.

In another aspect, a method for displaying a user interface in a display device is provided. The display method includes: displaying, by a display device comprising a memory storing instructions and a processor in communication with the memory, the user interface on a display of the display device, wherein the user interface includes a plurality of view display areas, each view display area includes one or more items, and the user interface further includes a focus object indicating that one of the one or more items is selected; and upon receiving a user input for moving the focus object in a view display area of the view display areas, moving, by the display device, a target item to a position where the focus object is by: in response to a number of the one or more items in the view display area being greater than a maximum number of items that can be displayed within a display range of the view display area on a screen of the display, displaying the one or more items in the view display area in a fixed focus cycling mode; and in response to the number of the one or more items in the view display area being less than or equal to the maximum number of the items displayable within the display range of the view display area on the screen of the display, displaying the one or more items in the view display area in a fixed focus non-cycling mode.

The present disclosure also describes a non-transitory computer readable storage medium storing computer readable instructions. The computer readable instructions, when executed by a processor, are configured to cause the processor to perform: displaying a user interface on a display of a display device, wherein the user interface includes a plurality of view display areas, each view display area includes one or more items, and the user interface further includes a focus object indicating that one of the items is selected; and upon receiving a user input for moving the focus object in a view display area of the view display areas, moving a target item to a position where the focus object is by: in response to a number of the one or more items in the view display area being greater than a maximum number of the items displayable within a display range of the view display area on a screen of the display, displaying the one or more items in the view display area in a fixed focus cycling mode, and in response to the number of the one or more items in the view display area being less than or equal to the maximum number of the items displayable within the display range of the view display area on the screen of the display, displaying the one or more items in the view display area in a fixed focus non-cycling mode.

BRIEF DESCRIPTION OF THE DRAWINGS

In order to more clearly describe the examples of the present application or the related art, the accompanying drawings for describing the examples or the related art will be briefly introduced below. Obviously, the drawings in the following description are merely some examples of the present application. Those skilled in the art may obtain other drawings based on these drawings without paying creative work.

DETAILED DESCRIPTION OF THE EMBODIMENTS

Figure 1:
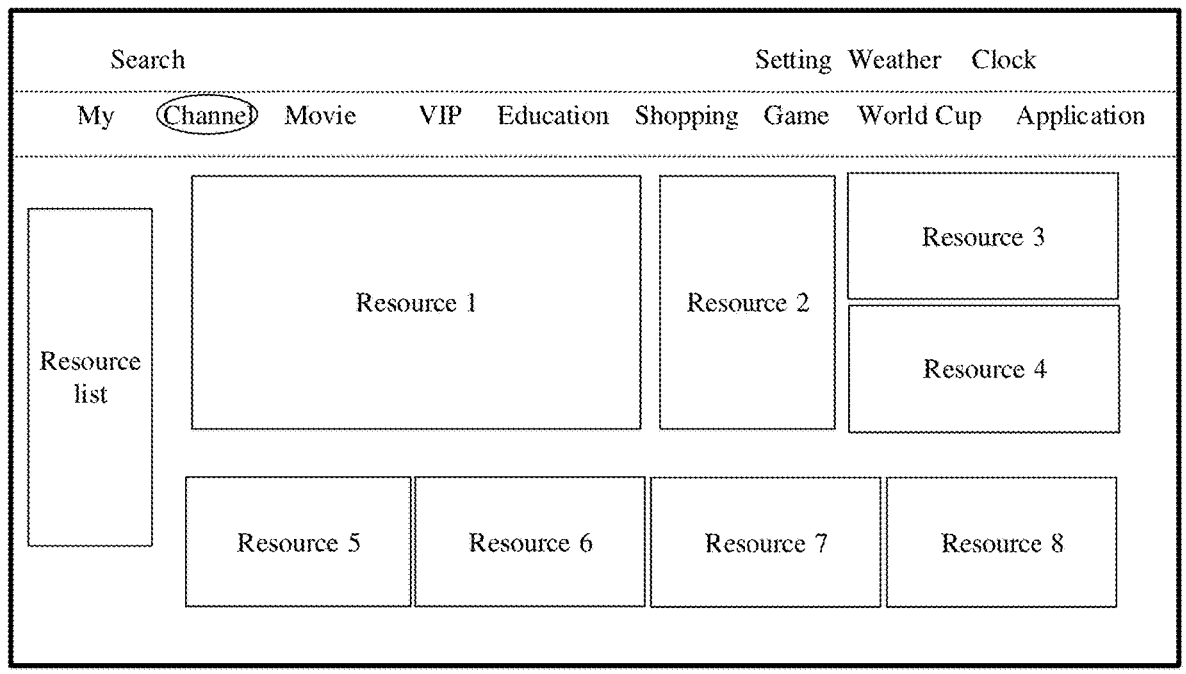
FIG. 1 is a schematic diagram illustrating a typical home page interface of a display device in the related art.

To make objects, embodiments, and advantages in the examples of the present application clearer, the examples of the present application will be described below clearly and completely in combination with the accompanying drawings. Apparently, the examples described herein are merely some examples of the present application rather than all examples.

For a method of displaying a home page interface in a display device in the related art, when a user selects a focus object, especially when the focus object is switched between a head and a tail of an item group in a view display area, the operation process is complicated. Especially, as functions of the display device are increasing and the operation data are increasing, the above problems are becoming more evident.

In order to solve these problems, examples of the present application provide a method for displaying a user interface and a display device. Items may be displayed in different fixed focus modes according to the number of items in a view display area. When there are a large number of items, a fixed focus cycling display mode is used to help users quickly find his or her desired item, which reduces their operations.

It should be noted that the method according to these examples of the application is applicable not only in the home page interface of the display device, but also in other interfaces of the display device.

The terms involved in the present application will be first described below with reference to the drawings. Here, it should be noted that the description for each term is only to make the contents of this application easier to understand, but does not intend to limit the protection scope of the application.

The term "module" used in the examples of the present application may refer to any known or later developed hardware, software, firmware, artificial intelligence, fuzzy logic, or a combination of hardware or/and software code(s) that may implement functions related to the module.

The term "remote control" used in the examples of the present application refers to a component of an electronic device, e.g., the display device disclosed in the present application, and the component may usually control the electronic device wirelessly within a short distance. Generally, this component may be coupled to the electronic device using infrared rays and/or radio frequency (RF) signals and/or Bluetooth, and may also include functional modules such as WiFi, wireless USB, Bluetooth, and motion sensors. For example, a handheld touch remote control is such a controller in which a user interface of its touch screen replaces most of physical built-in hard keys in common remote control device.

The term "gesture" used in the examples of the present application refers to a user behavior for conveying an expected thought, action, purpose and/or result through a change in the hand form, a hand motion or other actions.

The term "hardware system" used in the examples of the present application may refer to a physical component having functions of computation, control, storage, input, and output, and including mechanical, optical, electrical, and magnetic devices such as integrated circuits (IC) and printed circuit boards (PCB). In the examples of the present application, the hardware system is usually also referred to as a motherboard or chip.

Figure 2:
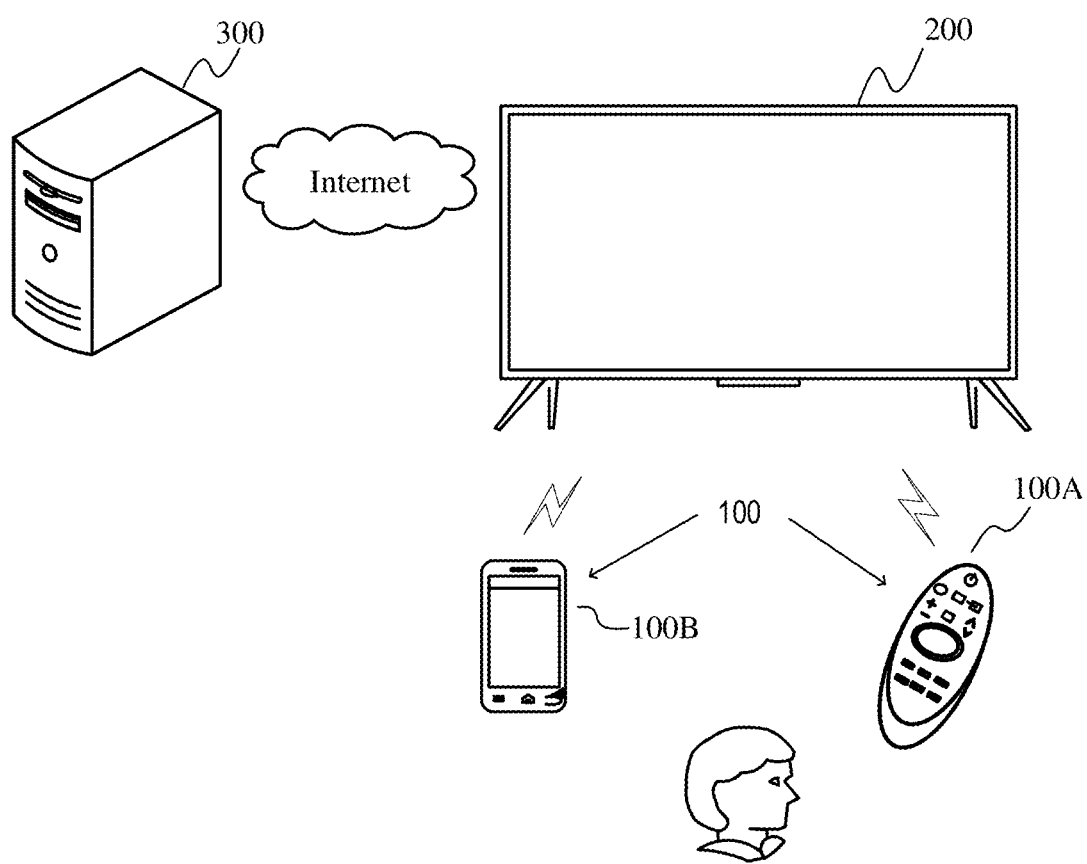
FIG. 2 is a schematic diagram illustrating an operation scene between a display device and a control device according to an example of the present application.

FIG. 2 is a schematic diagram illustrating an operation scene between a display device and a control device according to an example of the present application. As shown in FIG. 2, a user may operate a display device 200 through a control device 100.

The control device 100 may be a remote control 100A which may communicate with the display device 200 through an infrared protocol, a Bluetooth protocol, a ZigBee protocol or other short-range communication methods and enables a user to control the display device 200 in a wireless or other wired manner. The user may control the display device 200 by inputting user instructions through voice inputs, buttons, a control panel, etc., on the remote control. For example, the user may realize the function of controlling the display device 200 by inputting corresponding control instructions through volume up and down buttons, channel control buttons, up/down/left/right buttons, a voice input button, a menu button, a power on/off button and the like on the remote control.

The control device 100 may also be an intelligent device such as a mobile terminal 100B, a tablet computer, a computer, and a notebook computer. The intelligent device may communicate with the display device 200 through a local area network (LAN), a wide area network (WAN), a wireless local area network (WLAN) or other network, and control the display device 200 through an application corresponding to the display device 200. For example, an application running on the intelligent device is configured to control the display device 200. The application may provide users with various controls through an intuitive user interface (UI) on a screen associated with the intelligent device.

As an example, both the mobile terminal 100B and the display device 200 may be installed with software applications, so that the communication therebetween may be achieved through a network communication protocol, thereby achieving the purpose of one-to-one control operation and data communication. For example, a control instruction protocol between the mobile terminal 100B and the display device 200 may be established, so as to cause a keyboard of remote present on the mobile terminal 100B synchronously, thereby realizing the function of controlling the display device 200 by controlling a user interface on the mobile terminal 100B. Audio and video contents displayed on the mobile terminal 100B may also be transmitted to the display device 200 to realize the synchronous display function.

As shown in FIG. 2, the display device 200 may also perform data communication with a server 300 through various communication means. In the examples of the present application, the display device 200 may be allowed to communicate with the server 300 through an LAN, a WLAN or other network. The server 300 may provide the display device 200 with various contents and interactions.

As an example, the display device 200 receives software program updates or accesses a digital media database stored remotely by sending and receiving information, as well as the interaction with the electronic program guide (EPG). The server 300 may include one or more groups of servers, or one or more types of servers. Video-on-demand, advertising services and other network services are provided through the server 300.

The display device 200 may be a liquid crystal display, an organic light emitting diode (OLED) display, a projection display device, or a smart TV. The specific type, size and resolution of the display device are not limited, and it will be understood by those skilled in the art that the display device 200 may make some changes in performance and configuration as needed.

In addition to the broadcast reception function, the display device 200 may provide smart network TV function with computer support function, such as a network TV, a smart TV, an internet protocol TV (IPTV), etc.

Figure 3:
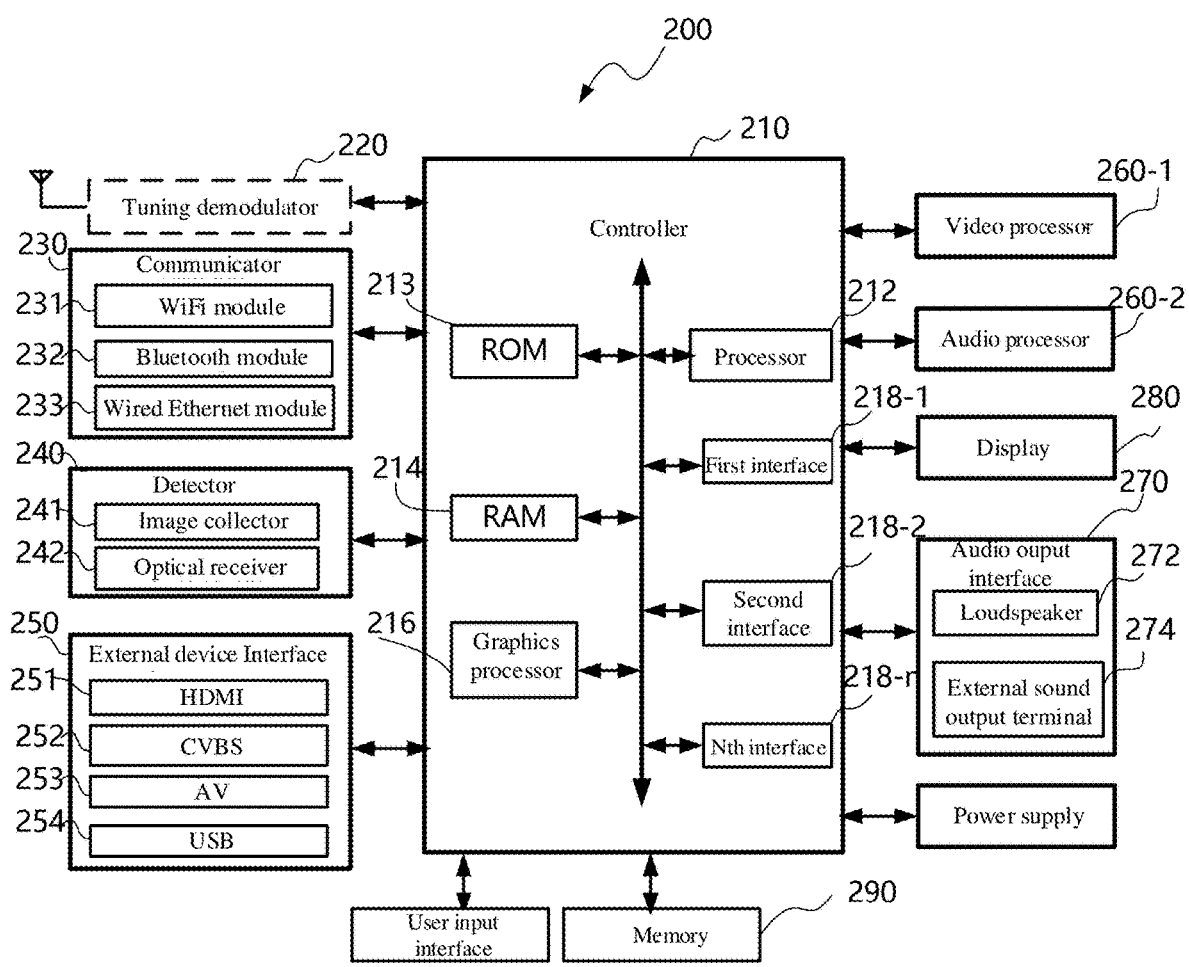
FIG. 3 is a block diagram illustrating a hardware configuration of a display device according to an example of the present application.

FIG. 3 is a block diagram illustrating a hardware configuration of a display device 200 according to an example of the present application. As shown in FIG. 3, the display device 200 may include a tuning demodulator 220, a communicator 230, a detector 240, an external device interface 250, a controller 210, a memory 290, a user input interface, a video processor 260-1, an audio processor 260-2, a display 280, an audio output interface 270, and a power supply.

The tuning demodulator 220, which receives broadcast signals in a wired or wireless manner, may perform amplification, frequency mixture, resonance and other modulation and demodulation processing, so as to demodulate audio and video signals, as well as additional information (such as EPG data) carried in a frequency of a channel selected by a user, from a plurality of wireless or wired broadcast signals.

The tuning demodulator 220 may, based on user's selection and controlling of the controller 210, respond to the frequency of the channel selected by the user and the signals carried in the frequency.

The tuning demodulator 220 may, according to different signal broadcasting systems, receive signals in many ways such as terrestrial broadcasting, wired broadcasting, satellite broadcasting or internet broadcasting. The tuning demodulator 220 may, according to different modulation types, use a digital modulation method or an analog modulation method. The tuning demodulator 220 may, according to different types of received signals, demodulate analog signal and digital signal.

In some other examples, the tuning demodulator 220 may also be located in an external device, for example, an external set-top box. In this way, the set-top box outputs audio and video signals through modulation and demodulation, and inputs the audio and video signals into the display device 200 through the external device interface 250.

The communicator 230 is a component configured to communicate with an external device or an external server according to various communication protocols. For example, the communicator 230 may include a WiFi module 231, a Bluetooth communication protocol module 232, a wired Ethernet communication protocol module 233 and other network communication protocol module or a near field communication protocol module.

The display device 200 may establish a connection for control signals and data signals with an external control device or content provision device through the communicator 230. For example, the communicator may receive a control signal from the remote control 100 according to the control of the controller.

The detector 240 is a component used by the display device 200 to collect signals from external environment or signals interacting with outside. The detector 240 may include an optical receiver 242 which is a sensor for collecting ambient light intensity, and the display device 200 may change display parameter adaptively in response to the collected ambient light intensity. The detector 240 may further include an image collector 241 such as a camera. The image collector may be used to collect external environment scenes and user attributes or user's interacting gestures, and the display device 200 may change display parameters accordingly, and recognize user gestures, so as to realize the function of interacting with the user.

In some other examples, the detector 240 may further include a temperature sensor. For example, by sensing ambient temperature, the display device 200 may adjust a color temperature of an image displayed accordingly. As an example, when in a higher-temperature environment, the color temperature of the image presented on the display device 200 may be adjusted to a cold color tone. When in a lower-temperature environment, the color temperature of the image presented on the display device 200 may be adjusted to a warm color tone.

In some other examples, the detector 240 may further include a sound collector such as a microphone. The sound collector may be used to receive a user's voice indicating the user's instruction for controlling the display device 200, or collect an ambient sound for identifying a type of an environment scene. In this way, the display device 200 may self-adapt to environment noises.

The external device interface 250 is a component for providing data transmission between the display device 200 and other external device based on the control of the controller 210. The external device interface may be coupled to an external device such as a set-top box, a game device, and a notebook computer in a wired/wireless manner, and may receive data, for example, video signals such as moving images, audio signals such as music, additional information such as EPG, and so on from the external device.

The interface of the external device 250 may include any one or more of a high-definition multimedia interface (HDMI) terminal 251, a composite video blanking synchronization (CVBS) terminal 252, an analog or digital component terminal 253, a universal serial bus (USB) terminal 254, a red-green-blue (RGB) terminal (not shown in the figure), etc.

The controller 210 controls the display device 200 and responds to user operations by running a variety of software control programs stored in the memory 290, for example, an operating system and/or various applications.

As shown in FIG. 3, the controller 210 or the processor includes a read only memory (ROM) 213, a random access memory (RAM) 214, a graphics processor 216, a CPU processor 212, a communication interface 218, and a communication bus. The ROM 213, RAM 214, graphics processor 216, CPU processor 212, and communication interface 218 are coupled through the bus.

ROM 213 is configured to store various kinds of instructions for system startup. For example, when receiving a power-on signal, the power supply of the display device 200 starts up, and the CPU processor 212 executes the instructions for system startup in the ROM and copies the operating system stored in the memory 290 to the RAM 214 to start the operating system. After the startup of the operating system is completed, the CPU processor 212 copies the various applications in the memory 290 to the RAM 214, and then starts these applications.

The graphics processor 216 is configured to generate various graphic objects such as icons, operation menus, graphics displayed via user input instructions and the like. The graphics processor 216 includes a calculator which performs calculation by receiving various interaction instructions input from a user, and displays objects according to display attributes. The graphics processor 216 further includes a renderer, which renders the objects obtained by the calculator and displays the rendering result on the display 280.

The CPU processor 212 is configured to execute instructions for the operating system and applications stored in the memory 290. According to the received interaction instructions input from the outside, the CPU processor 212 is further configured to run applications, data and contents, so as to finally display and play audio and video contents.

In some examples, the CPU processor 212 may include a plurality of processors. The plurality of processors may include a host processor and one or more sub-processors. The host processor is configured to perform some operations of the display device 200 in a preloading mode, and/or to perform operations of displaying the image in a normal mode. The one or more sub-processors are used to perform operations in a standby mode or other mode.

The communication interface may include a first interface 218-1 to an nth interface 218-n. These interfaces may be network interfaces coupled to external devices via a network.

The controller 210 may control the overall operation of the display device 200. For example, in response to receiving a user instruction for selecting a UI object displayed on the display 280, the controller 210 may perform an operation related to the object selected by the user instruction.

The object may be any one of available objects for selection, such as a hyperlink or an icon. The operation related to the selected object may be, for example, an operation of displaying a hyperlinked page, a document, and an image, or an operation of running programs corresponding to an icon. The user instruction for selecting the UI object may be an instruction input through an input device (such as a mouse, a keyboard, and a touch pad) coupled to the display device 200, or a voice instruction corresponding to a voice spoken by a user.

The memory 290 includes software modules for driving and controlling the display device 200. For example, the software modules in the memory 290 include: a base module, a detection module, a communication module, a display control module, a browser module, various service modules, etc.

The base module is a low layer software module for signal communication between the hardware modules and sending processing and control signals to an upper-layer module in the display device 200. The detection module is a management module for collecting information from sensors or user input interfaces, and performing digital-to-analog conversion and analysis management.

For example, a voice recognition module includes a voice analysis module and a database module for voice instructions. The display control module is a module for controlling the display 280 to display the image, which may be used to play the multimedia image, UI and other information. The communication module is a module for performing control and data communication with external devices. The browser module is a module for performing data communication between browsing servers. The service modules are modules for providing all kinds of services and including various applications.

The memory 290 is further configured to store external data and user data, images of items in each user interface, visual effect images of a focus object, etc.

The user input interface is configured to send user input signals to the controller 210 or send, to the user, signals output from the controller. As an example, a control device such as a mobile terminal or a remote control may send a signal input from a user to the user input interface, such as a power on/off signal, a channel selection signal, and a volume adjustment signal, and then the signal input from the user is transferred from the user input interface to the controller. Alternatively, the control device may receive signals such as an audio, a video, or data processed by the controller and output from the user input interface, display the received output signals, or output the received output signals in audio or vibration form.

In some examples, a user may input a user instruction on a graphical user interface (GUI) displayed on the display 280, and the user input interface receives the user input instruction through the GUI. Alternatively, the user may input a user instruction by inputting a particular voice or gesture, and the user input interface identifies the voice or gesture through the sensor to receive the user input instruction.

The video processor 260-1 is configured to receive video signals, and perform video data processing such as decompression, decoding, scaling, noise reduction, frame rate conversion, resolution conversion, and image synthesis according to the standard encoding/decoding protocol of input signals, so as to obtain video signals that may be displayed or played directly on the display 280.

As an example, the video processor 260-1 includes a demultiplexing module, a video decoding module, an image synthesis module, a frame rate conversion module, a display formatting module, etc.

The demultiplexing module is configured to perform demultiplexing processing on input audio and video data streams. If MPEG-2 data is input, the demultiplexing module demultiplexes the data into a video signal and an audio signal.

The video decoding module is configured to process the demultiplexed video signal, including the decoding processing and the scaling processing.

The image synthesis module, for example, an image synthesizer, is configured to superimpose and mix a GUI signal with a scaled video image so as to generate an image signal for display where the GUI signal is generated by a graphics generator itself or according to user inputs.

The frame rate conversion module is configured to convert the frame rate of an input video. For example, the frame rates of 24 Hz, 25 Hz, 30 Hz or 60 Hz of input video are converted into the frame rates of 60 Hz, 120 Hz or 240 Hz. The input frame rate may be related to a source video stream, and the output frame rate may be related to a refresh rate of a display screen. The usual method for the input is for example frame interpolation.

The display formatting module is configured to change a signal output from the frame rate conversion module into a signal conforming to the display format of a display for example, e.g., the format of the signal output from the frame rate conversion module is converted to output data signals of RGB format.

The display 280 is configured to receive image signals input from the video processor 260-1 to display video, images and a menu control interface. The display 280 includes a screen module for presenting an image and a driving module for driving the image to display. The displayed video may be from the video in the broadcast signals received by the tuning demodulator 220, or from the video input by the communicator or external device interface. The display 280 also displays a UI generated in the display device 200 and controls the display device 200.

The display 280, depending on its different types, further includes the driving component for driving the display. Alternatively, if the display 280 is a projection display, it may further include a projection device and a projection screen.

The audio processor 260-2 is configured to receive audio signals and perform audio data processing such as decompression, decoding, noise reduction, digital-to-analog conversion, and amplification according to the standard encoding/decoding protocol of input signals, so as to obtain audio signals that may be played in a loudspeaker 272.

An audio output interface 270 is configured to receive audio signals output by the audio processor 260-2 under the control of the controller 210. The audio output interface may include the loudspeaker 272, or an external sound output terminal 274 output to a sounding apparatus of an external device, for example, an external sound terminal or a headphone output terminal.

In some other examples, the video processor 260-1 may include one or more chips. The audio processor 260-2 may also include one or more chips.

In some other examples, the video processor 260-1 and the audio processor 260-2 may be a separate chip respectively, or be integrated into one or more chips together with the controller 210.

The power supply is configured to provide power input by an external power source to the display device 200 under the control of the controller 210, so as to support the power supply. The power supply may include a built-in circuit inside the display device 200, or may be a power supply set outside the display device 200, for example, an interface that provides an external power source in the display device 200.

Figure 4:
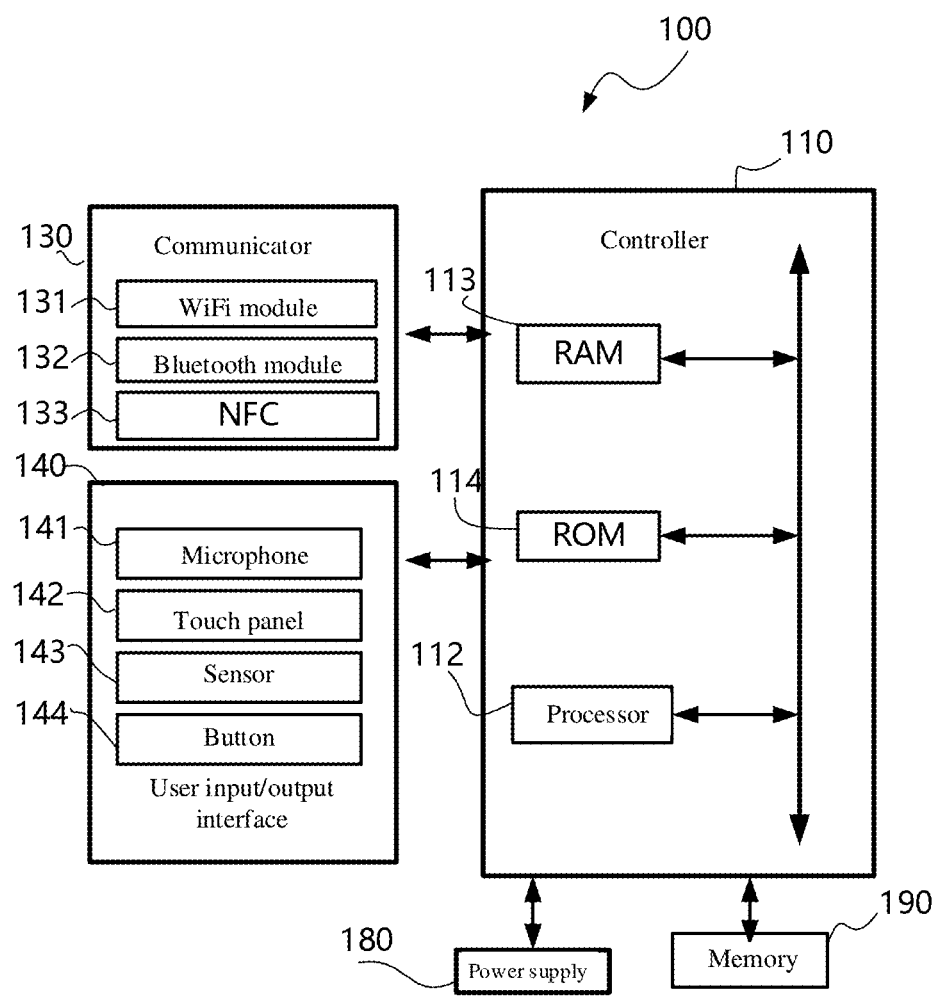
FIG. 4 is a block diagram illustrating a hardware configuration of a control device according to an example of the present application.

FIG. 4 is a block diagram illustrating a configuration of a control device 100 according to an example of the present application. As shown in FIG. 4, the control device 100 includes a controller 110, a communicator 130, a user input/output interface 140, a memory 190, and a power supply 180.

The control device 100 is configured to control the display device 200, receive operation commands input from a user, and convert the operation commands into instructions that are recognized and responded by the display device 200, which plays an interaction role between the user and the display device 200. For example, the user operates channel up or down button on the control device 100, and the display device 200 responds to the operation to make the channel go up or go down.

In some examples, the control device 100 may be a smart device. For example, the control device 100 may be installed with apps for controlling the display device 200 according to user requirements.

In some examples, as shown in FIG. 2, the mobile terminal 100B or other intelligent electronic device may function similarly to the control device 100, after the applications for controlling the display device 200 are installed. For example, by installing the applications, function buttons or virtual buttons of a GUI may be provided on the mobile terminal 100B or other intelligent electronic device to realize the function of physical buttons of the control device 100.

The controller 110 includes a processor 112, an RAM 113, an ROM 114, a communication interface, and a communication bus. The controller 110 is configured to control the running and operation of the control device 100, the communication and cooperation among internal components, and external and internal data processing in the control device.

The communicator 130 realizes the communication of control signals and data signals with the display device 200 under the control of the controller 110. For example, a received signal input from the user is sent to the display device 200. The communicator 130 may include at least one of a WiFi module 131, a Bluetooth module 132, an NFC module 133 or other communication module.

In the user input/output interface 140, the input interface includes at least one of a microphone 141, a touch panel 142, a sensor 143, a button 144 or other user input interface. For example, an input function of the user instruction may be realized through user's actions such as voices, touches, gestures, and presses. The input interface converts a received analog signal into a digital signal, and then the digital signal into a corresponding instruction signal, before sending the instruction signal to the display device 200.

The output interface includes an interface that sends the received user instruction to the display device 200. In some examples, the interface may be an infrared interface or a radio frequency interface. For example, if the interface is the infrared interface, a user input instruction is converted into an infrared control signal according to an infrared control protocol, and then the infrared control signal is sent to the display device 200 via an infrared sending module. For another example, if the interface is the radio frequency interface, the user input instruction is converted into a digital signal, and then the digital signal is sent to the display device 200 via a radio frequency sending terminal after being modulated according to a modulation protocol of a radio frequency control signal.

In some examples, the control device 100 includes at least one of the communicator 130 or the output interface. The control device 100 is configured with the communicator 130 such as the WiFi module, the Bluetooth module, and the NFC module which may encode an instruction input from the user through a WiFi protocol or a Bluetooth protocol or an NFC protocol, and send the encoded instruction to the display device 200.

The memory 190 is configured to store programs, data, and applications that drive and control the control device 100 under the control of the controller 110. The memory 190 may store instructions for the control signal input from a user.

The power supply 180 is configured to provide power to each element of the control device 100 under the control of the controller 110. The power supply 180 may be batteries and related control circuits.

Figure 5:
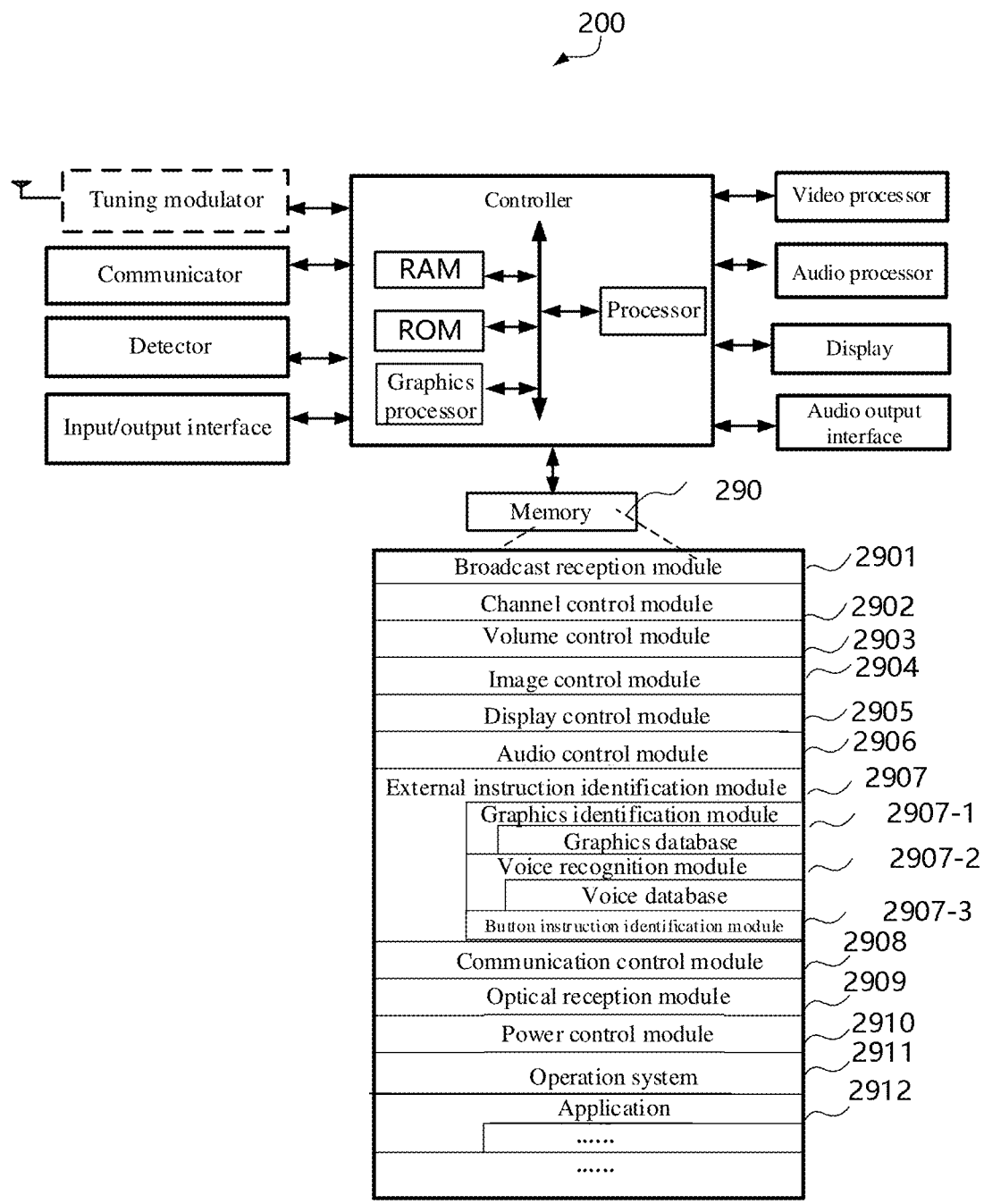
FIG. 5 is a schematic diagram illustrating a functional configuration of a display device according to an example of the present application.

FIG. 5 is a schematic diagram illustrating a functional configuration of a display device 200 according to an example of the present application. As shown in FIG. 5, the memory 290 is configured to store an operating system, applications, contents, user data, etc., and drive the system of the display device 200 to run and respond to user operations under the control of the controller 210. The memory 290 may include a volatile memory and/or a non-volatile memory.

The memory 290 is configured to store programs that drive the controller 210 in the display device 200 to run, applications built in the display device 200, applications downloaded by a user from an external device, GUIs related to applications, objects related to GUIs, data information of the user, and internal data that supports applications. The memory 290 is configured to store system software such as an operating system (OS) kernel, middleware, and applications, as well as input video data and audio data, and other user data.

The memory 290 is configured to store drive programs such as the video processor 260-1, the audio processor 260-2, the display 280, the communicator 230, the tuning demodulator 220, the detector 240, and the input/output interface, as well as related data.

In some examples, the memory 290 may store software and/or programs. Software programs for the OS illustratively include a kernel, middleware, an application programming interface (API), and/or applications. As an example, the kernel may control or manage resources of the system, or functions implemented by other programs such as the middleware, API, or applications. The kernel may provide an interface to allow the middleware and API or applications to access the controller, so as to control or manage the resources of the system.

As an example, the memory 290 includes a broadcast reception module 2901, a channel control module 2902, a volume control module 2903, an image control module 2904, a display control module 2905, an audio control module 2906, an external instruction identification module 2907, a communication control module 2908, and an optical reception module 2909, a power control module 2910, an operating system 2911, other apps 2912, a browser module, etc. The controller 210 executes software programs in the memory 290 to implement the following function: a broadcast signal reception demodulation, a channel selection control, a volume selection control, an image control, a display control, an audio control, an external instruction identification, a communication control, an optical signal reception, a power control, software control platforms that support various functions, a browser and other application function.

Figure 6A:
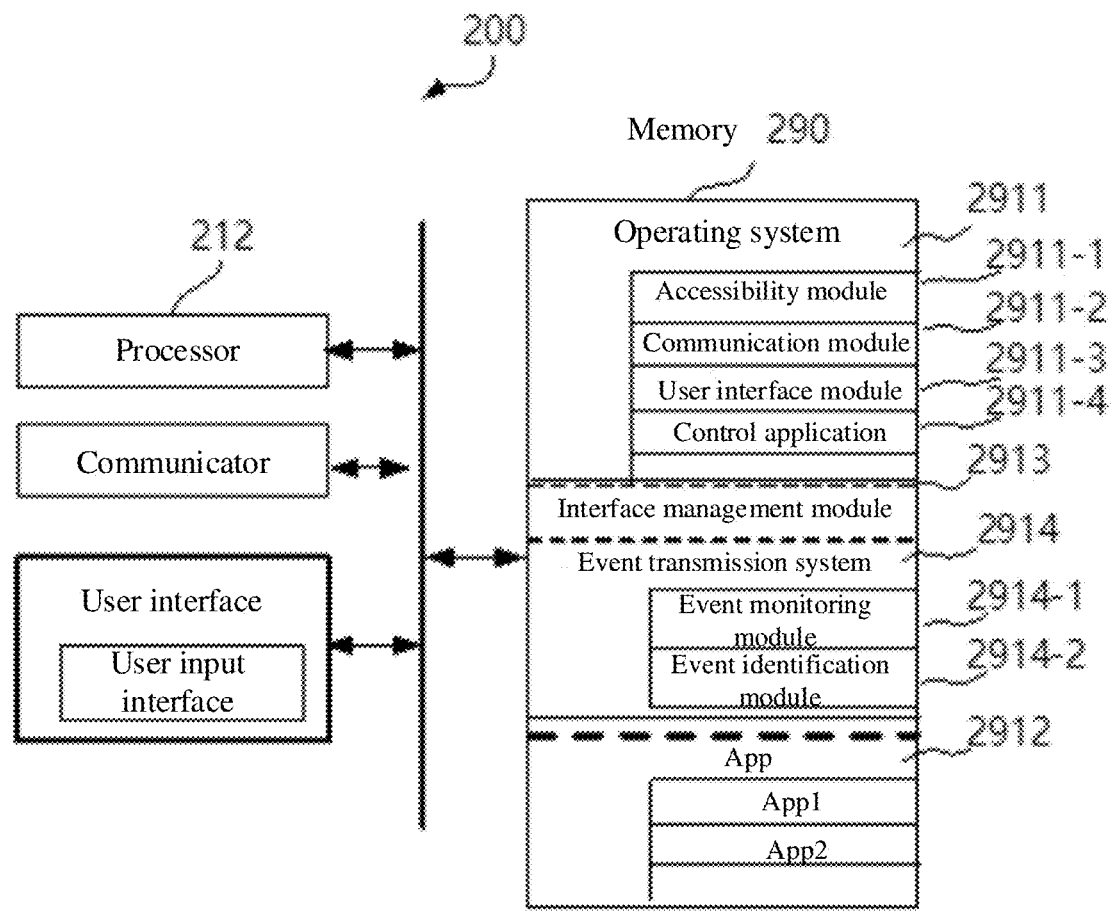
FIG. 6A is a schematic diagram illustrating a software configuration of a display device according to an example of the present application.

FIG. 6A is a block diagram illustrating a software system configuration of a display device 200 according to an example of the present application. As shown in FIG. 6A, the operating system 2911 includes the executive operating software for processing basic system services and implementing tasks related to the hardware, and serves as a medium for completing data processing between the application and the hardware component.

In some examples, a part of the operating system kernel may include a series of software configured to manage the hardware resources of the display device and provide services for other programs or software codes.

In some other examples, a part of the operating system kernel may include one or more device drivers. The device drivers may be a set of software codes in an operating system configured to help operate or control a device or hardware associated with the display device. The drivers may contain codes for operating videos, audios and/or other multimedia components. Examples of the drivers include a display screen driver, a camera driver, a Flash driver, a WiFi driver and an audio driver.

An accessibility module 2911-1 is configured to modify or access the app so as to realize the accessibility of the app and the operability of the displayed content thereof.

A communication module 2911-2 is configured to connect with other external devices through a related communication interface and a communication network.

A user interface module 2911-3 is configured to provide the display of objects of a user interface, such that apps may access, thereby realizing user operability.

A control app 2911-4 is configured to control process management, and includes a runtime app, etc.

An event transmission system 2914 may be implemented in the operating system 2911 or the app 2912. In some examples, the event transmission system 2914 is implemented in both the operating system 2911 and the application 2912, so as to monitor events input from the user, thereby implementing processing programs of one or more sets of predefined operations based on an identification result for responding to the events or subevents.

An event monitoring module 2914-1 is configured to monitor events or subevents input from a user input interface.

An event identification module 2914-2 is configured to define the events input from the user input interface, identify and transmit the events or subevents to the processor that performs processing programs of one or more sets of predefined operations.

The events or subevents refer to inputs detected by one or more sensors in the display device 200 and inputs from an external control device such as the control device 100, for example, subevents input through voices, subevents input through gestures by gesture recognition, and subevents input through the press of the button of the control device. As an example, one or more subevents in a remote control have a plurality of forms, including but not limited to, one or combination of pressing up/down/left/right buttons, a OK button, pressing a button for a certain time, and operations of non-physical buttons, such as moving, pressing, releasing or the like.

An interface management module 2913 is configured to directly or indirectly receive the user input events or subevents monitored by the event transmission system 2914, and update the display effect of items in the home page interface. The display effects include but not limited to, the fixed focus cycling scroll display or fixed focus scroll display of the items in the interface.

Figure 6B:
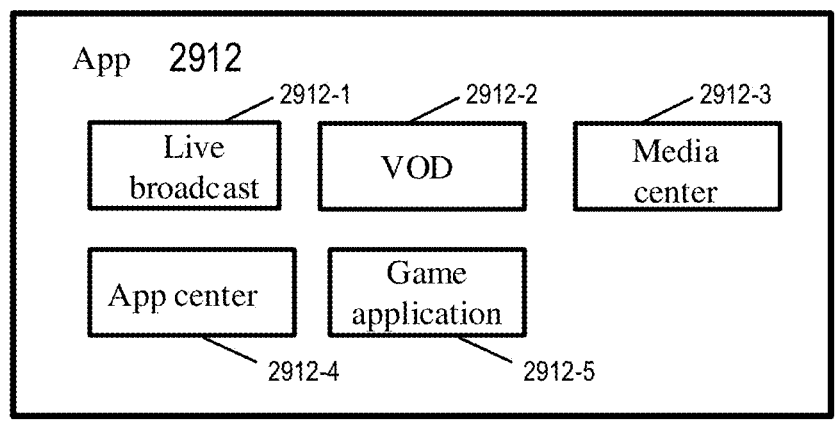
FIG. 6B is a schematic diagram illustrating a configuration of applications in a display device according to an example of the present application.

As shown in FIG. 6B, an app layer 2912 contains applications that may be executed in the display device 200. The applications may include but is not limited to one or more apps, such as a live broadcast app 2912-1, a VOD app 2912-2, a media center app 2912-3, an app center 2912-4, and a game application 2912-5.

The live broadcast app 2912-1 may provide the live broadcast through different signal sources. For example, the live broadcast app may use the signals input from wired broadcast, wireless broadcast, satellite services, or other types of live broadcast services. The live broadcast app may display the video from live broadcast signals on the display device 200.

The VOD app 2912-2 may provide videos from different storage sources. Different from the live broadcast app, the VOD app provides the display of videos from certain storage sources. For example, the VOD may be from a cloud storage server, or a local hard disk storage containing stored video programs.

The media center app 2912-3 may provide apps for playing the multimedia content. For example, different from the live broadcast app or the VOD app, a user may access services provided by the image or audio through the media center app.

The app center 2912-4 may store various applications. The applications may include a game app, or some other apps that are related to a computer system or other device and may be running in a display device. The app center may obtain these apps from different sources, store the apps in a local storage. The apps may be executable on the display device 200.

Figure 7:
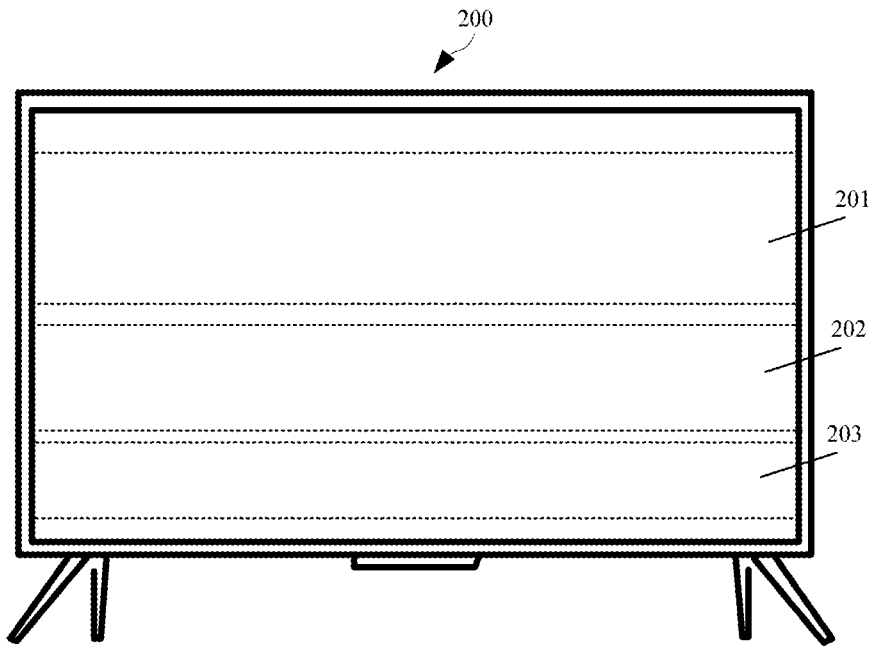
FIG. 7 is a schematic diagram illustrating a home page interface of a display device according to an example of the present application.

FIG. 7 is a schematic diagram illustrating a home page interface of a display device 200 according to an example of the present application. As shown in FIG. 7, a user interface includes a plurality of view display areas. As an example, the plurality of view display areas include a first view display area 201, a second view display area 202, and a third view display area 203. Each of the plurality of view display areas presents one or more different items. The user interface also includes a selector indicating that any one of the items is selected. A different item may be selected through a user input.

It should be noted that the plurality of view display areas may be separated by a visible boundary or invisible boundary. For example, different view display areas may be identified by different background colors of the view display areas, and may also be identified by visible boundary or invisible boundary. There may be the invisible boundary. Alternatively, there may not be the visible boundary or the invisible boundary, and only related items in a certain area are displayed on the screen. In a case where the related items possess same changing attribute for size and/or arrangement, boundaries of the certain area is regarded as the boundaries of the same view display area. For example, the items in the view display area 201 are simultaneously reduced or enlarged, but changes of the view display area 202 are different.

In some examples, one or more of the above view display areas may be displayed in a scalable manner. "Scalable" may represent that the size or area of a view display area on a screen is scalable, or the size or area of an item in the view display area on the screen is scalable.

The "item" refers to a visual object displayed in a view display area of the user interface of the display device 200 to represent corresponding contents such as icons, thumbnails, and video clips. For example, items may represent the images or video clips of movies and TV series, audios of music, apps, or other history information of contents accessed by the user.

In some examples, the "item" may display image thumbnails. For example, when the item is a movie or TV series, the item may be displayed as a poster of the movie or TV series. If the item is music, the item may be displayed as a poster of a music album. If the item is an app, the item may be displayed as an icon of the app, or a screenshot of the app that is captured when this app is executed recently. If the item is a user access history, the item may be displayed as a screenshot of the process of the recent execution. The "item" may be displayed as a video clip. For example, the item is a dynamic video clip of a trailer of a movie or TV series.

In addition, the item may represent an interface or a set of interfaces through which the display device 200 is connected to an external device, or name of the external device connected to the display device, or the like. For example, a set of input interfaces of the signal source, or an HDMI interface, a USB interface, a PC terminal interface, etc.

Figure 9A:
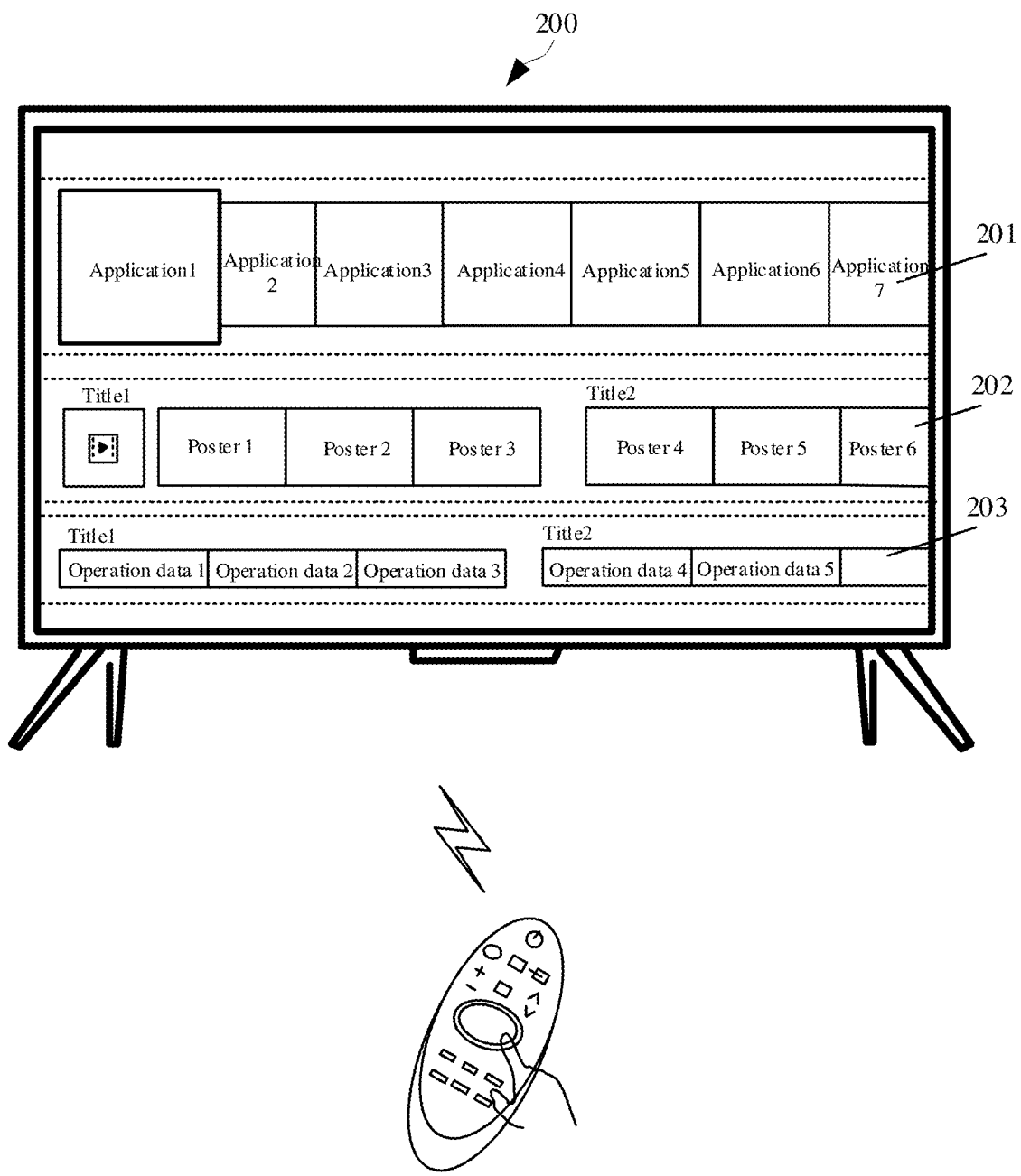
FIGS. 9A-9C are schematic diagrams illustrating an operation between a control device and a display device according to an example of the present application.

For example, as shown in FIG. 9A, items displayed in the first view display area 201 are mainly application data such as applications 1 to 7 in the figure. Items displayed in the second view display area 202 are mainly online movies such as posters 1 to 6 in the figure. Items displayed in the third view display area 203 are mainly the data related to the device system such as operation data 1 to 5 in the figure. In some examples, each item may include the text, and/or images for displaying thumbnails related to the text contents, or video clips related to the text. In some other examples, each item may be a text of an app or icon of an app.

The items may have the same size or different sizes. In some examples, the sizes of the items may be changed.

"Selector", is used to indicate that one item among the items has been selected, for example, a cursor or a focus object. According to the user input through the control device 100, the cursor is controlled to move on the display device 200 to select or control an item. According to the user input through the control device 100, the focus object displayed in the display device 200 may be moved to select or control an item, and thus one or more items may be selected or controlled. For example, a user may control the movement of the focus object between items through direction buttons on the control device 100, so as to select and control an item.

The focus object refers to an object that moves between items based on a user input. For example, as shown in FIG. 9A, a bold line is drawn on edges of the item to realize or identify the location of the focus object. In other examples, form of the focus object is not limited to the above form. The focus object may be in a tangible form, such as cursor, or intangible form that can be identified by a user, the focus form may be a 3D deformation of an item. Alternatively, the focus object may be identified by changing border line, size, color, transparency, outline and/or font of the text or image of a focus item.

In some examples, items in each view display area are associated with different contents or links respectively. As an example, items in the first view display area 201 are texts and/or icons of apps. Items in the second view display area 202 are thumbnails of posters or video clips. Items in the third view display area 203 are system related texts and/or icons. It should be noted that the view display areas in this example are arranged transversely on the screen, and in actual application, they may also be arranged longitudinally or at any other angle.

Referring to FIG. 6A, the event transmission system 2914 may monitor a user input of each predefined event or subevent, and directly or indirectly provide the control of the identified event or subevent to the interface management module 2913.

The interface management module 2913 is configured to monitor the state of the user interface (including the location and/or size, change processes and the like of view display areas, items, focus objects, cursor object or the like), and perform the fixed focus cycling scroll display or the fixed focus scroll display of the items in each view display area of the interface based on the event or subevent.

In some other examples, the user interface may include one or more view display areas, and the layout and the number of view display areas on a display screen is determined based on the number of different categories of contents to be displayed.

Figure 8:
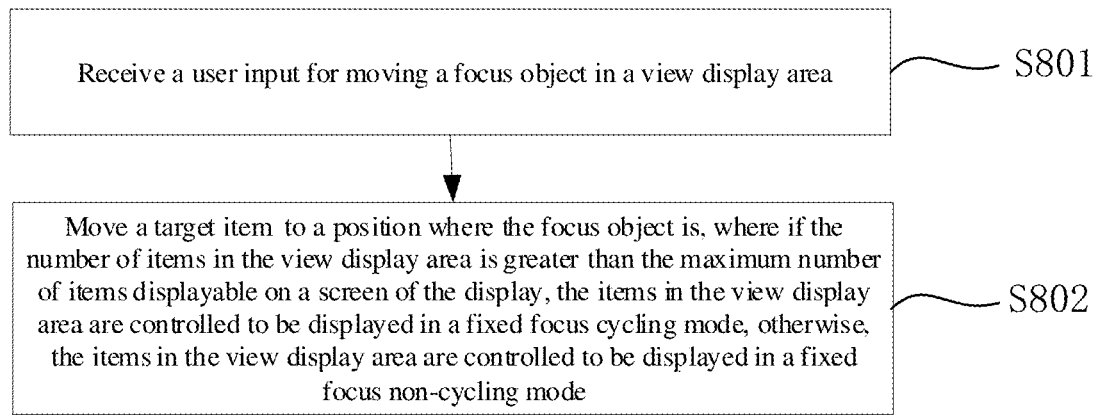
FIG. 8 is a schematic flowchart illustrating a method of presenting a user interface in a display device according to an example of the present application.

FIG. 8 is a schematic flowchart illustrating a method of presenting a user interface in a display device 200 according to an example of the present application. As shown in FIG. 8, the method includes the following steps S801 to S802.

At S801, a user input for moving a focus object in a view display area is received.

Upon receiving a user input, a type of the event of the user input is determined. The controller of the display device 200 is configured to monitor the type of the event of the user input, for example, to monitor whether a button input is from a left or right navigation button. When it is detected that the event of the user input is a left or right button input, a positional monitor of a selector in a user interface is performed. Further, it is determined whether the selector is located on an item in a view display area. If so, it is indicated that the button input is to update the focus object in the view display area, that is, to move the focus object to the left or the right, as a response of the display device to the button input.

At S802, a target item is moved to a position where the focus object is. If a number of items in the view display area is greater than a maximum number of items displayable on a screen of the display, the items in the view display area are controlled to be displayed in a fixed focus cycling mode, otherwise, the items in the view display area are controlled to be displayed in a fixed focus non-cycling mode. In another implementation, when a number of items in the view display area is greater than a maximum number of items displayable within a display range of the view display area on a screen of the display, the items in the view display area are controlled to be displayed in a fixed focus cycling mode, otherwise, the items in the view display area are controlled to be displayed in a fixed focus non-cycling mode.

That is, according to predetermined display modes of items, the items in the view display area are controlled to be scrollably displayed on the user interface in the cycling mode, or movably displayed on the user interface in the non-cycling mode; and meanwhile, the target item is moved to the position where the focus object is, so that the display position of the selected target item in the user interface is unchanged, which is the fixed focus display.

Figure 9B:
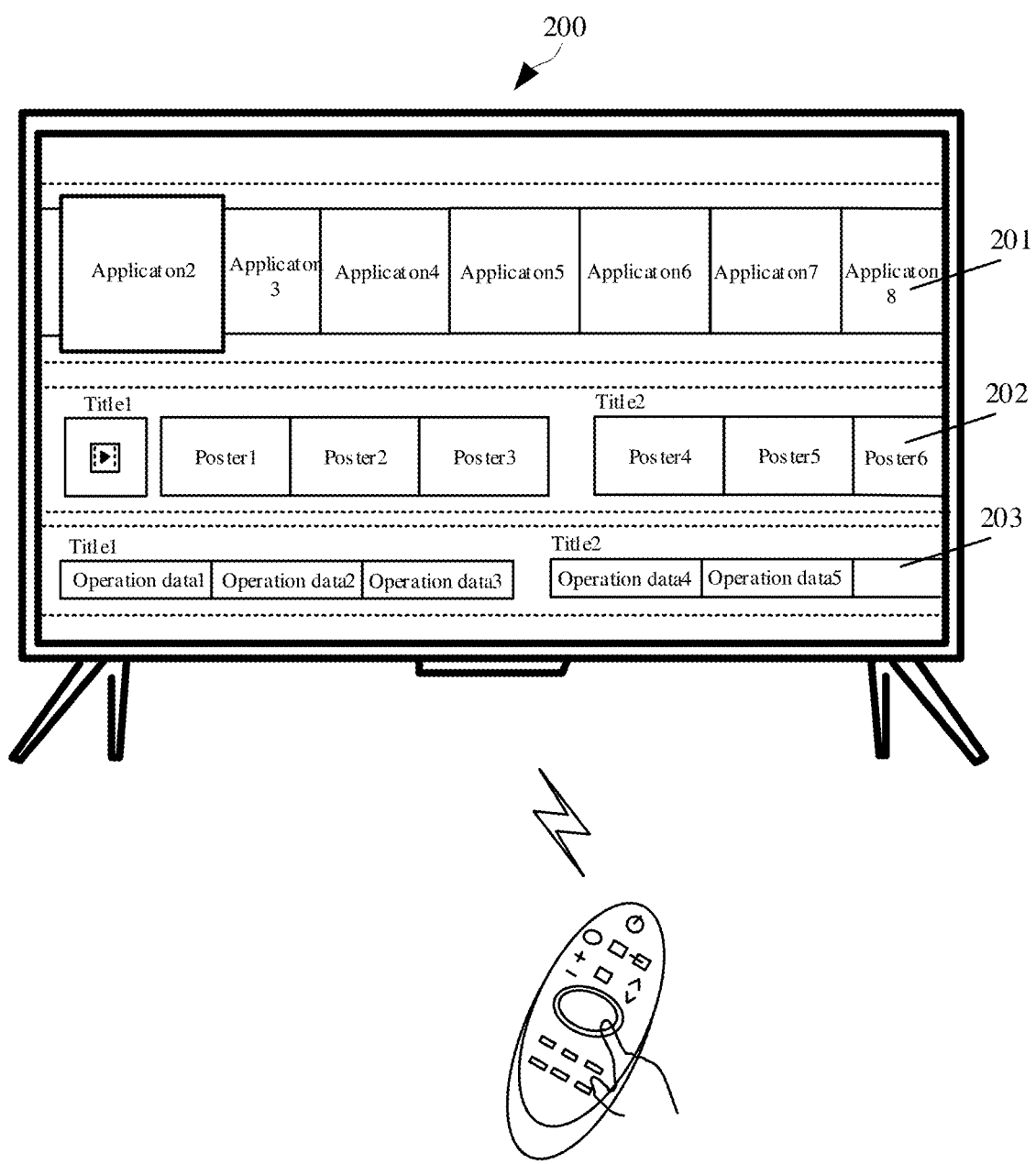
Figure 9C:
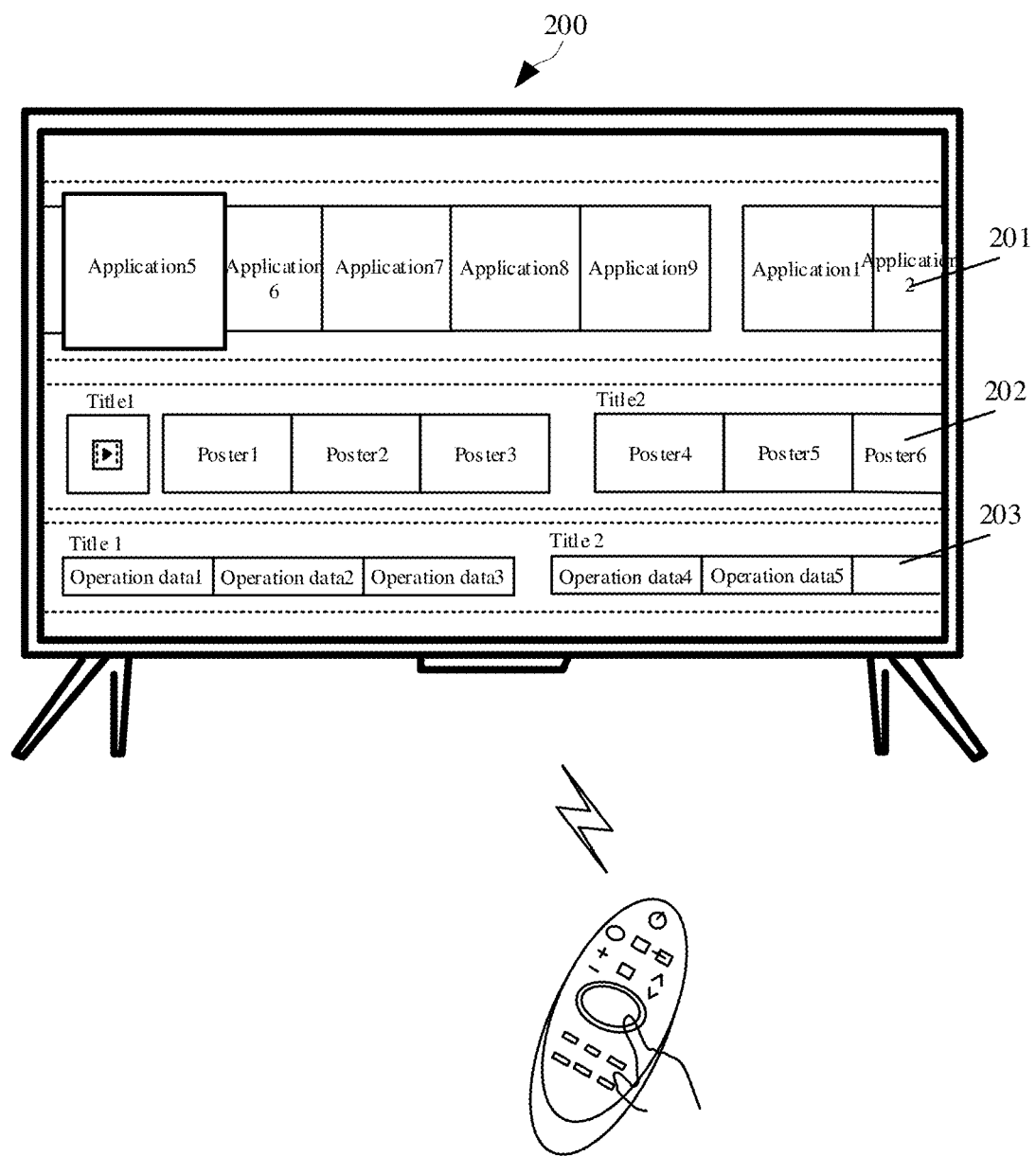

FIGS. 9A-9C are schematic diagrams illustrating an operation between a control device 100 and a display device 200 according to an example of the present application. It is assumed that there are nine items in total in the first view display area 201, as shown in FIG. 9A, initially items 8 and 9 are located outside the display range of the screen, so that they are not displayed on the screen.

In this example, the items in the first view display area 201 may be applications that the display device recommends, and each item is presented in the form of an icon.

As shown in FIG. 9A, currently the selector is located on a first item, i.e., application 1, in the first view display area 201, and meanwhile, a selected item i.e., the focus object, is identified by a bold line on the edges and enlarged icon. If the operation input from the user on the control device 100 is a right button operation, such as pressing a right button on a remote control once, it is indicated that the focus object is to be switched from the current application 1 to application 2. An interface presented on the display device 200 is as shown in FIG. 9B in response to the user input. All items in the first view display area 201 are shifted toward left by a width of one item, thereby ensuring that the position of the switched focus object, i.e., the application 2, is still at the position where the focus object in FIG. 9A is located, which realizes the fixed focus scroll display. In this way, a user may conveniently see the selected item, which effectively prevents the location of the current focus object from being unknown due to multiple operations on the control device 100.

In some examples of the present application, if a user, on the basis of FIG. 9B, continuously presses the right button three times on the remote control, or holds the right button and then releases the right button on the remote control until the focus object is switched to application 5, a user interface is presented as shown in FIG. 9C. Moreover, the applications 1 to 3 will continue to line up to a tail of the item queue and wait for being displayed on the screen, after being moved out from a left side of the screen. As shown in FIG. 9C, the applications 1 and 2 are re-displayed on the screen, which realizes the fixed focus scroll cycling display of the items in the view display area. In this way, it is convenient for the user to see the items in the view display area. In one implementation, optionally, the fixed focus scroll cycling display may refer as that the items in the view display area are displayed in the fixed focus cycling mode. Besides, if the user desires to re-select the application 1, he/she may continue to press the right button directly, without pressing a left button multiple times to perform a return operation. Of course, if, for example, a current item corresponding to the focus object is close to a target item, the user may perform an operation of pressing the left button.

Figure 10A:
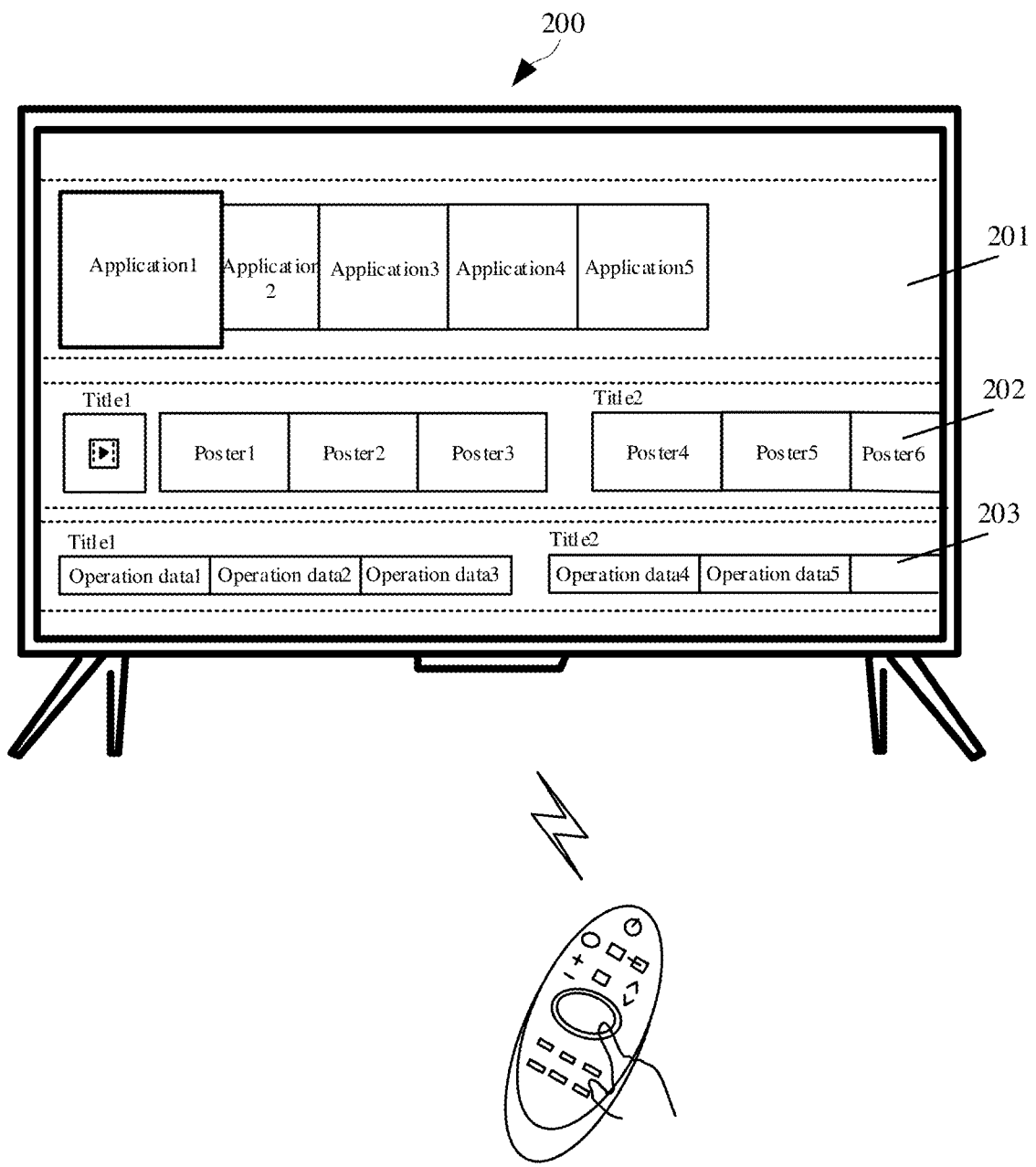
FIGS. 10A and 10B are schematic diagrams illustrating another operation between a control device and a display device according to an example of the present application.
Figure 10B:
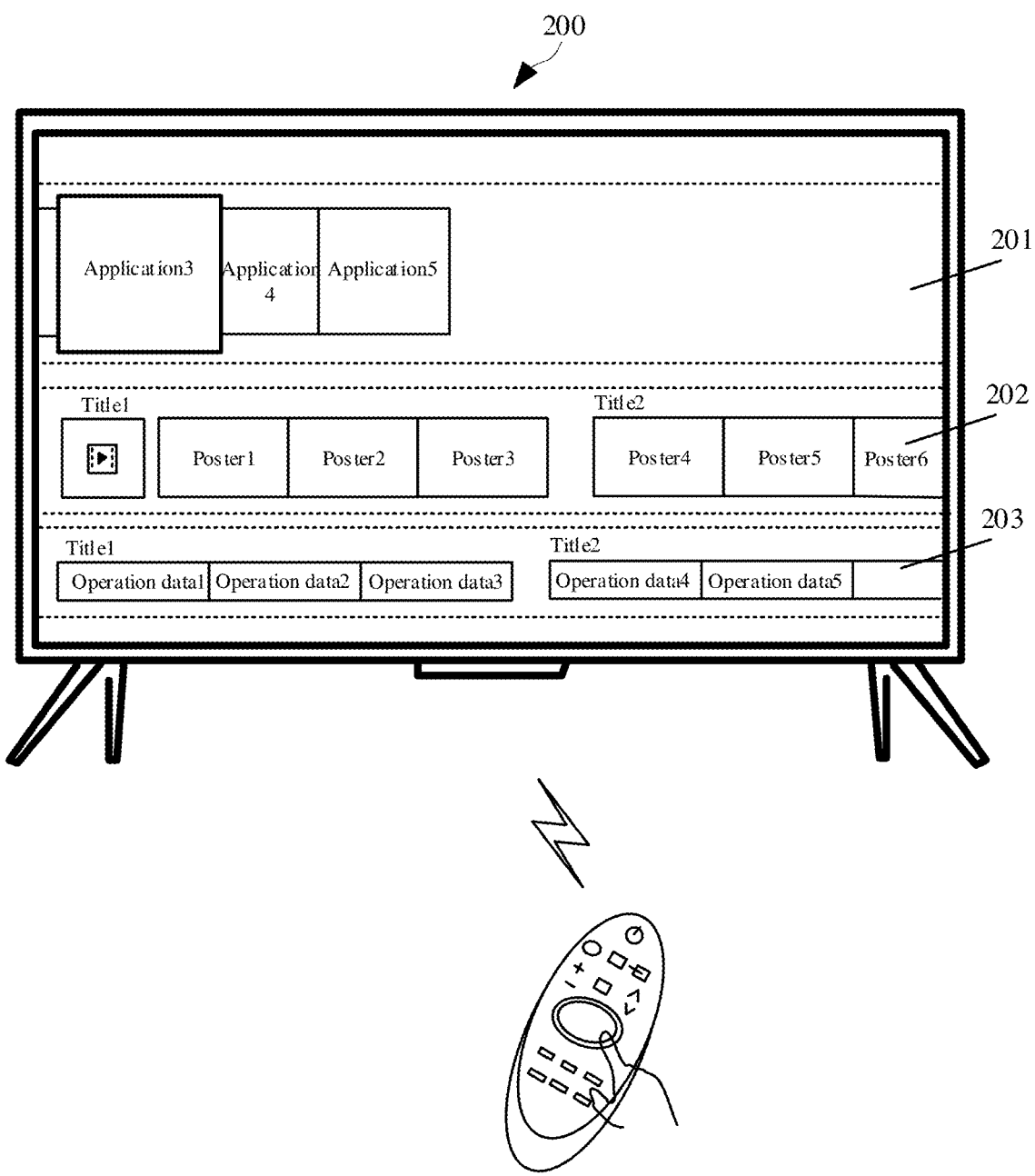

FIGS. 10A and 10B are schematic diagrams illustrating another operation between a control device 100 and a display device 200 according to an example of the present application. For the flexibility of displaying the items in the view display area, it is provided in this example that the data in the first row of the view display area may be edited by a user himself. As shown in FIG. 10A, after the user deletes some applications, there are only five items in the view display area, that is, the number of items in the view display area is less than the maximum number of items displayable on the screen of the display. If the cycling scroll mode is used again, a situation where the distance between a head and a tail of an item queue is too large may occur. In this case, the cycling scroll display mode will not be used again in this example.

As shown in FIG. 10B, the focus object is the application 3, and the applications 1 and 2 are not re-displayed in the item queue after being moved out from the left side of the screen. Therefore, in this example, the display mode of items is automatically selected based on the number of the items, which enables a user to quickly find desired contents, ensures the visual aesthetics of the user interface and facilitates the improvement of user experience. In one implementation, optionally, the display in FIGS. 10A and 10B, may refer as that the items in the view display area are displayed in the fixed focus non-cycling mode.

In a current trend where the display device is designed to achieve smooth operation, reduce the amount of memory consumed by software programs themselves and decrease production costs, how to achieve the fixed focus display on a display device without affecting performance of the display device is also a problem to be solved.

Figure 11A:
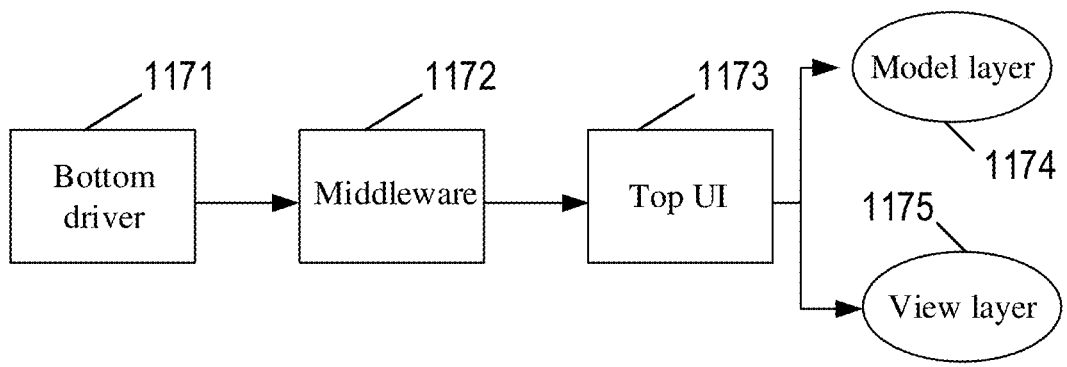
FIG. 11A is a schematic diagram illustrating an overall hierarchical structure of a Linux system in a display device according to an example of the present application.

As a display device may realize more and more functions, a Linux system with advantages such as good stability and rich support of software is usually adopted as a system of the display device. FIG. 11A is a schematic diagram illustrating an overall hierarchical structure of a Linux system in a display device 200 according to an example of the present application. As shown in FIG. 11A, the system may be substantially divided into three parts: a bottom driver 1171, middleware 1172, and a top UI 1173. The top UI 1173 may be subdivided into a model layer 1174 (i.e., a data layer) and a view layer 1175. If the model layer changes, the page display of the view layer will be driven to change.

Figure 11B:
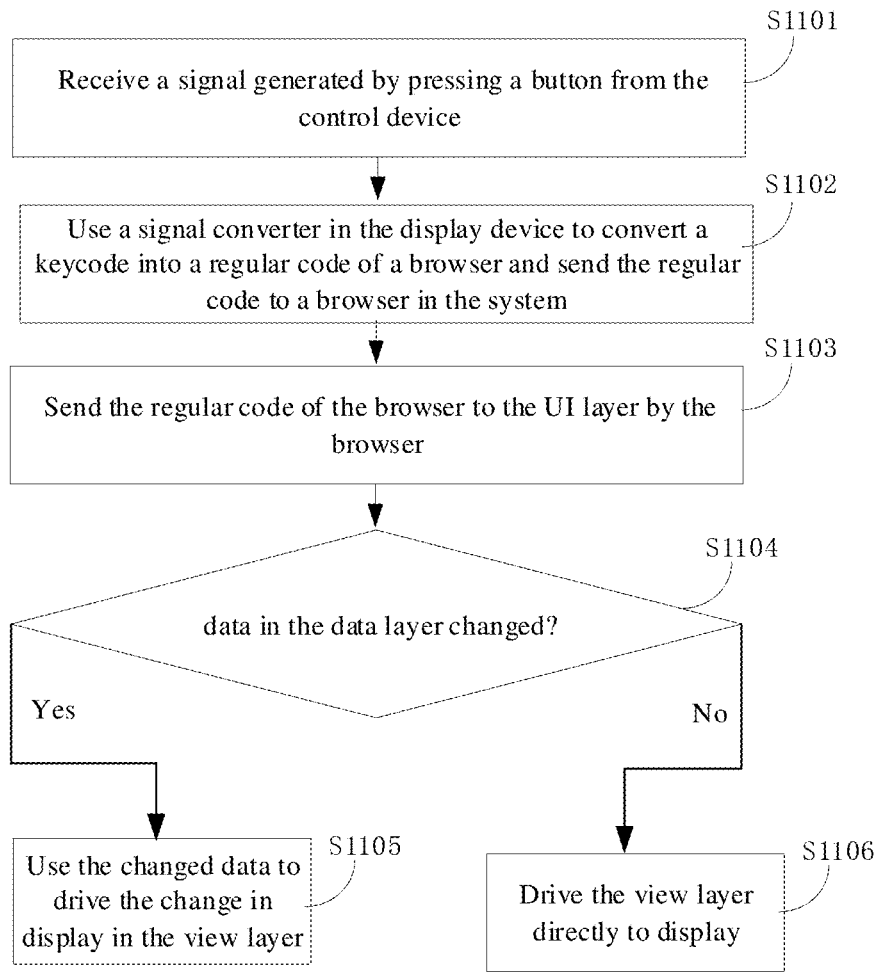
FIG. 11B is a schematic flowchart illustrating a response of a button press of a Linux system in a display device according to an example of the present application.

Based on the above-described system, the display effect of the user interface is a process that a page is driven to respond to the button pressing and then an operation in each part of the page is performed. FIG. 11B is a schematic flowchart illustrating a response of a button press of a Linux system in a display device 200 according to an example of the present application. As shown in FIG. 11B, the response process is as follows.

At S1101, the bottom driver in the system receives a signal generated by pressing a button from the control device.

For example, the control device 100 is a remote control. When a user presses the right button on the remote control, the remote control emits infrared rays and sends the infrared rays to an infrared ray reception interface of the display device 200, which transmits the infrared rays to the bottom driver. The bottom driver, upon receiving the infrared signal, determines a keycode corresponding to the infrared signal.

At S1102, a signal converter in the display device is used to convert a keycode into a regular code of a browser and send the regular code to a browser in the system. In one implementation, the regular code of the browser may refer to a browser code or a browser-recognizable code, which may be recognized and processed by a browser in the system.

For example, a distributed feedback (DFB) semiconductor laser is used to map the key code, convert it into a regular code of the browser, and send the regular code of the browser to the browser in the display device system.

At S1103, the browser sends the regular code of the browser to the UI layer.

The browser, after receiving the regular code of the browser, directly distributes it to the UI layer (i.e., top UI) without the processing of button press event.

At S1104, the UI layer determines whether data in the model layer needs to change.

If the UI layer determines that the data in the model layer needs to change, the method goes to step S1105. At S1105, the changed data is used to drive the change in display on the view layer. Otherwise, the method goes to step S1106. At S1106, the view layer is directly driven to display.

As can be seen from the above driving process, the presentation of the UI is mainly based on the browser. As in a web page, the entire UI is regarded as a local website. For example, during the startup of the display device, the browser is driven to start up, and the browser opens index.html of the UI by default to launch or skip to the UI. Therefore, the browser, as a presentation carrier of the UI, plays a very important role. In order to reduce the burden of the browser brought about by the UI, the amount of data added to the browser and the interactive operations related to the browser is to be reduced.

Figure 11C:
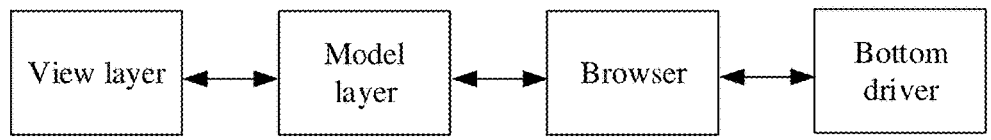
FIG. 11C is a schematic diagram illustrating a data interaction of a Linux system in a display device according to an example of the present application.

FIG. 11C is a schematic diagram illustrating a data interaction of a Linux system in a display device 200 according to an example of the present application. As shown in FIG. 11C, when the UI is operated on the display device, the response speed thereof is affected mainly by the following factors:

1) The amount of data: the amount of data will apparently affect the speed of the browser launching a page and the operation speed on the web page. The more data the webpage loads, the slower the speed is.
2) The times of interaction: during the running of UI, the view layer of the UI is substantially not involved in the interaction with a bottom layer. A part that may interact with both the bottom driver and the browser is the model layer. In order to increase the operation speed of the UI, times of data interaction between the bottom driver and/or the browser and the UI are to be reduced. In terms of the UI, times of interaction may be reduced as far as possible for the data interaction between the view layer and a model layer of the UI.

3) The performance of a memory and hardware of a display device.

4) The performance of a browser carrying the UI.

Based on the above factors, there are three aspects to increase the running speed in terms of the UI: reducing the amount of data for driving the UI to present; reducing the times of data interaction between the view layer and the model layer of the UI; and reducing the times of data interaction between the model layer and the bottom driver. Since the functional requirements of the display device limit the optimization in the third aspect, the previous two aspects are optimized. In this context, an example of the application uses the following three different methods to achieve the display of items in the view display area in the fixed focus cycling mode.

Figure 12:
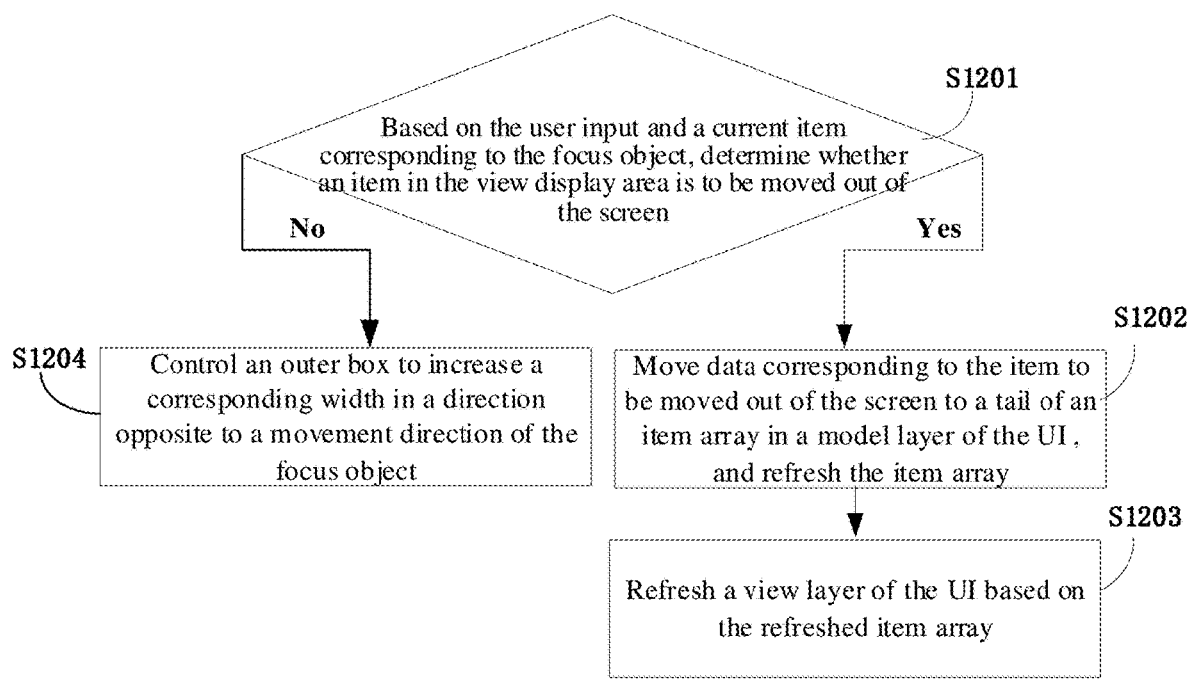
FIG. 12 is a schematic flowchart illustrating a method of controlling items in a view display area of a display device to display in a fixed focus cycling mode.

FIG. 12 is a schematic flowchart illustrating a method of controlling items in a view display area of a display device 200 to display in a fixed focus cycling mode. As shown in FIG. 12, this method includes the following steps S1201 to S1204.

At S1201, based on the user input and a current item corresponding to the focus object, it is determined whether an item in the view display area is to be moved out of the screen.

For example, when a user presses the right button on a remote control, the remote control emits infrared rays and sends the infrared rays to an infrared ray reception interface of the display device 200, which transmits the infrared rays to the bottom driver. The bottom driver, after receiving the infrared signal, determines a key code corresponding to the infrared signal. Then, a distributed feedback (DFB) semiconductor laser in the display device 200 is used to map the key code, convert the key code into a regular code of the browser, and send the regular code of the browser to the browser in the display device system. The browser, after receiving the regular code of the browser, directly distributes the regular code to the UI layer without processing of the button press event. The UI layer processes the regular code of the browser and detects the position of a selector in the UI. If the selector is determined to be located on an item in the view display area, it is indicated that the input of the button press is to update the focus object in the view display area.

In some examples of the present application, based on the user input and a current item corresponding to the focus object, it is determined whether an item is to be moved out of the screen in the view display area after the movement of the focus object (for convenience of description, changes in a selected item indicated by the focus object is referred to as movement of the focus object in this example). For example, in a case where the item selected by the focus object is the application 1 in FIG. 9A, i.e., the first item, if a user presses the right button on the remote control once, that is, a user input is to move the focus object toward right by one item, no item will be moved out of the screen. However, except that the focus object is the first item, any one of right movements of the focus object will cause an item to be moved out of the screen.

If an item is to be moved out of the screen, the method goes to step S1202. Otherwise, the method goes to step S1204.

At S1202, data corresponding to the item that is to be moved out of the screen is moved to a tail of an item array in a model layer of the UI, and the item array is refreshed.

At S1203, a view layer of the UI is refreshed based on the refreshed item array.

Refreshing the item array once by each movement will change the order of items. At this time, the order of items displayed on the screen will also be changed, thereby achieving a visual cycling display effect.

At S1204, an outer box is controlled to increase a corresponding width in a direction opposite to a movement direction of the focus object, where the width is set based on a requirement of moving the target item to the position where the focus object is.

If a user presses the left button, the corresponding focus object moves towards left. Then the outer box is controlled to move towards right, and in order to ensure an unchanged position of a selected target item presenting on the screen, that is, the target item is moved to a position where the current focus object is located, the width of the outer box is determined based on the width of a moved item, the space between items, and a blank width between a head and a tail of an item queue in the view display area.

In this example, implementations for view display areas are classified into two boxes, and in this example, the two boxes are called an outer box and an inner box. The outer box mainly controls the fixed focus display, and contains all data in the view display area in an entire row, so the data in the entire row will move together during the switching of the focus object. The inner box controls the display style of the focus object, and directs to an item in a single view display area. During the switching of the focus object, a currently selected item, in addition to following the outer box to move, is further to carry out the conversion of the out-of-focus style by itself. Similarly, the target item to be selected, in addition to following the outer box to move, is further to carry out the conversion of the focus acquisition style by itself.

FIGS. 13A-13D are schematic diagrams illustrating effects achieved on a home page interface of a display device 200 according to the method in FIG. 12.

Figure 13A:
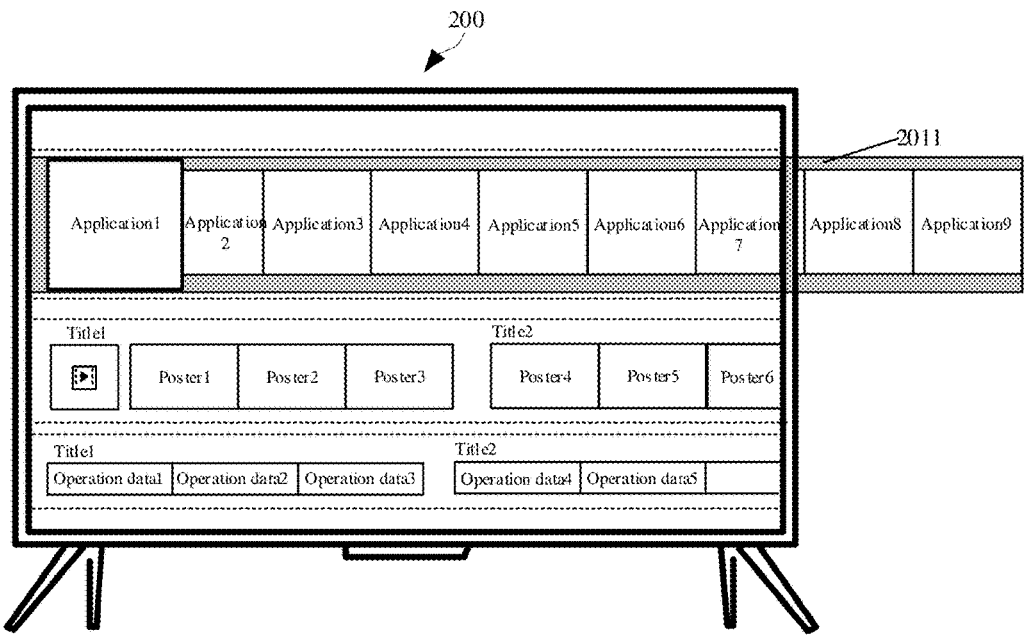
FIGS. 13A-13D are schematic diagrams illustrating effects achieved on a home page interface of a display device according to the method in FIG. 12.

As shown in FIGS. 13A-13D, in this example, the first view display area in the first row is still taken as an example. It is assumed that there are nine items in total in the first view display area. As shown in FIG. 13A, an initial position of the items after startup is shown, and items 8 and 9 are located outside the display range of the screen, so they are not displayed on the screen. And item 7 is partially displayed on the screen.

The shade marks the outer box 2011, and the outer box contains all items. In this state, the corresponding item array is {item1, item2, item3, . . . , item9}.

On the basis of FIG. 13A, if a user performs an operation, such as pressing the right button, the corresponding focus object moves towards right by one item. Correspondingly, a corresponding width is added to the outer box on the left side according to the width of the first item, the gap between the first and second items, and the width of the blank on the left side of the first item. When the widths of the first and second items are inconsistent, the width to be added is further determined according to the width of the second item. Moreover, the inner box controls the focus object to switch from the first item to the second item, thereby obtaining a display interface in FIG. 13B.

Figure 13B:
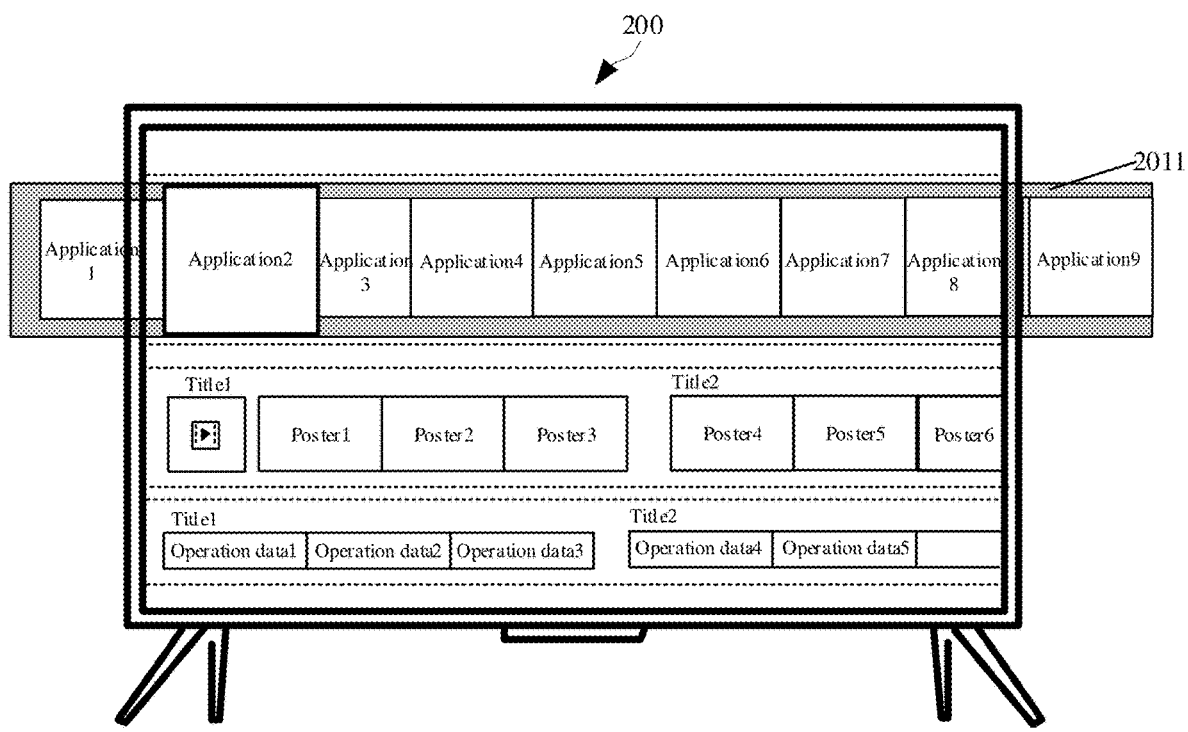

On the basis of FIG. 13B, if a user performs an operation, such as pressing the right button, the corresponding focus object moves towards right by one item; or, on the basis of FIG. 13A, if the user presses the right button twice, the corresponding focus object moves towards right by two items. At this time, after the focus object switches, since the application 1 is moved out of the screen, the model layer of a launcher or a portal in the UI will be notified at this time to change the order in corresponding data of the model layer and move item 1 to the tail of the queue. Then, the item array is {item2, item3, item4, . . . , item1} after being refreshed. Due to changes in data structure in the model layer, the order of items displayed on the screen is changed correspondingly when the view layer is driven to display, thereby achieving a visual circling display effect and obtaining a display effect shown in FIG. 13C.

Figure 13C:
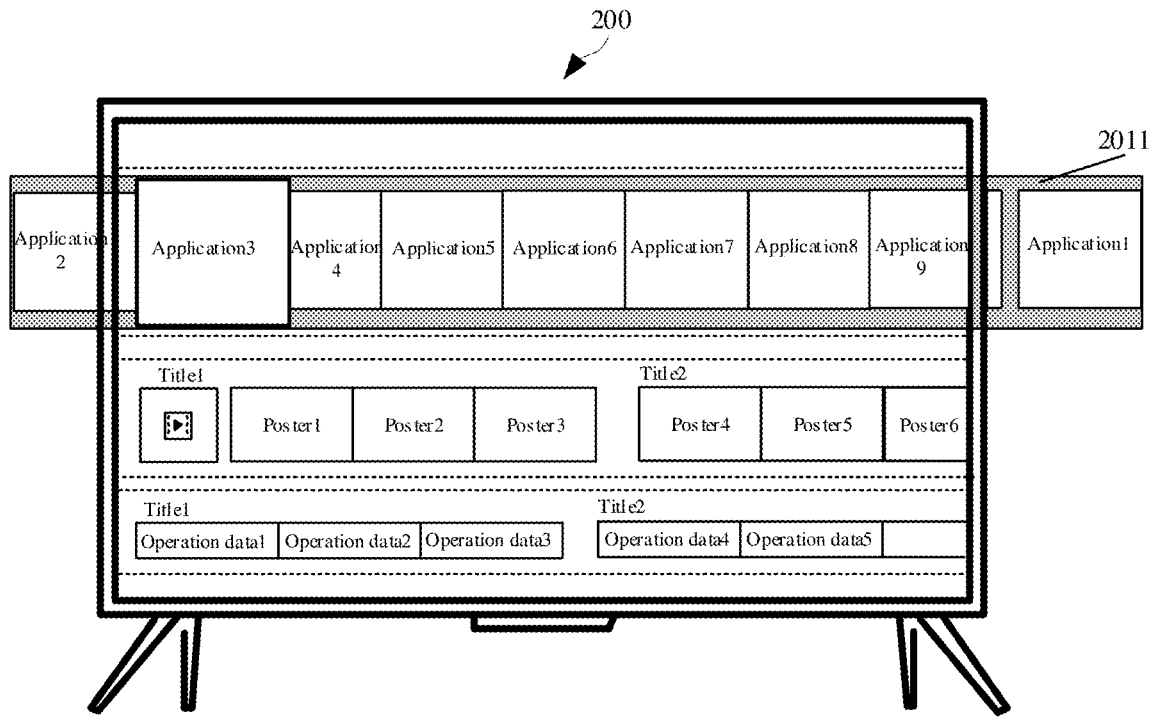
Figure 13D:
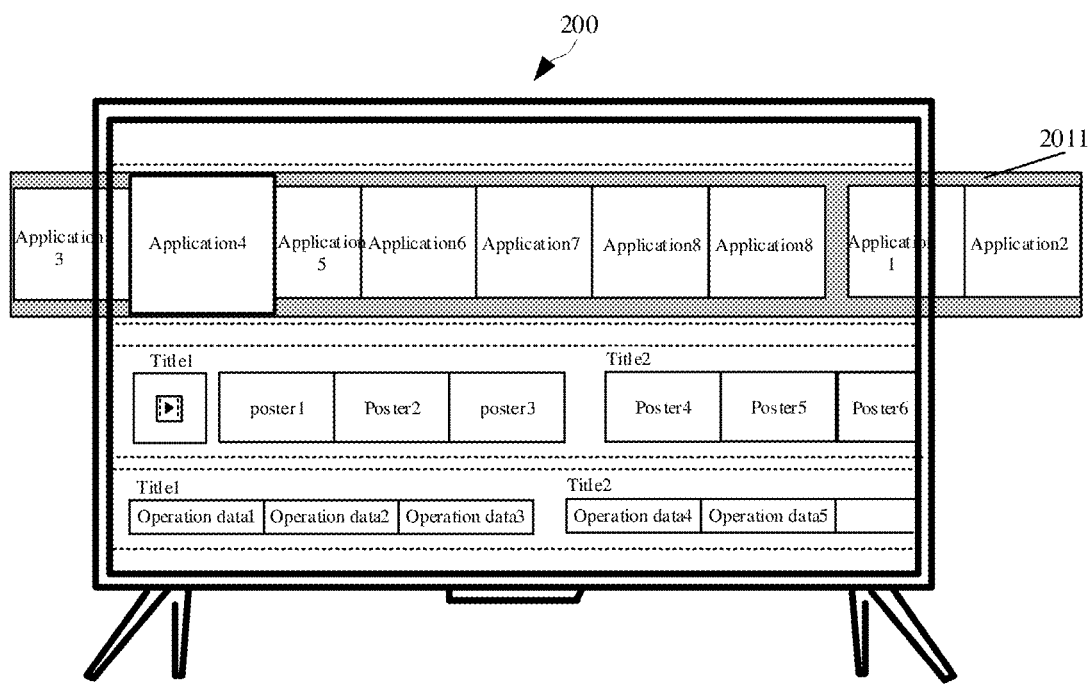

Similarly, on the basis of FIG. 13C, if a user presses a right button, the corresponding focus object moves towards right by one item. Of course, the focus object may also be updated on the bases of FIG. 13A or 13B. At this time, after the focus object is switched, since the application 2 is moved out of the screen, item 2 will be moved to the tail of the queue. Then the item array is {item3, item4, items, . . . , item2} after being refreshed, thereby obtaining a display effect shown in FIG. 13D in which the application 1 removed out of the screen is re-displayed on the screen.

Using the above implementing scheme, the outer box is not to be moved every time. The outer box is to be moved towards left by the width of one item when the focus is switched for the first time, that is, when no item is moved out of the screen, the position of the outer box is fixed, thereby reducing animation superposition.

However, in the above-described scheme, except the first switching of the focus object, each time the focus is switched, the content in Data in the model layer is refreshed correspondingly, so as to change the order of data, increasing the burden of the browser. In addition, with a mechanism of driving the page by data based on a Vue framework, the data refresh causes a DOM (Document Object Model) tree structure to refresh. Every time the DOM is refreshed, it may cause a lagging phenomenon on the user interface. Based on the above phenomenon, an embodiment of the present application provides another scheme.

Figures 14, 15:
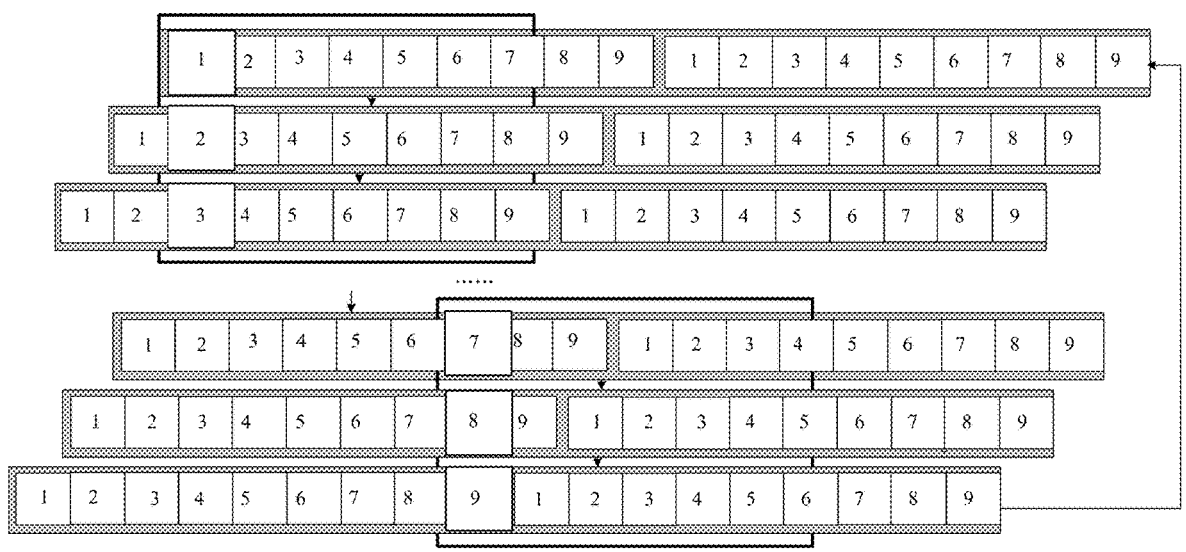
FIG. 14 is another schematic flowchart illustrating a method of controlling items in a view display area of a display device to display in a fixed focus cycling mode.
FIG. 15 is a schematic diagram illustrating effects achieved correspondingly according to the method in FIG. 14.

FIG. 14 is another schematic flowchart illustrating a method of controlling items in a view display area of a display device 200 to display in a fixed focus cycling mode. As shown in FIG. 14, the method includes the following steps S1401 to S1402.

At S1401, a target item is determined based on a user input and a current item corresponding to the focus object.

For example, if the current focus object is the first item in the view display area, the corresponding target item is the second item in the view display area when the display device receives an instruction generated by pressing a right button; if the current focus object is the last item in the view display area, the corresponding target item is the first item in the view display area when the display device receives an instruction generated by pressing the right button.

At S1402, based on a space between the target item and the current item, an outer box is controlled to move a corresponding distance in a direction opposite to a movement direction of the focus object.

In an example, data of an item array in the model layer of the UI is formed by connecting two groups of data corresponding to all items in the view display area. For example, it is assumed that the data group corresponding to all items in the view display area is Data1, for example, {item2, item3, item4 . . . item1}, the Data1 is copied as Data2; then the Data1 and Data2 are connected to form a new array Data used as an item array in the model layer of the UI. In new array Data, the content thereof is a connection value of the Data1 and Data2, which is Data=Data1.concat(Data2). In this way, when displaying the View, double contents of the original data will be displayed.

Based on the above data structure, when the focus is switched, according to the space between the target item and the current item, the outer box is controlled to move by a corresponding distance in the direction opposite to the movement direction of the focus object. In order to ensure that the display position of the focus object on the screen is fixed, the space between the target item and the current item is determined based on some or all of factors including the widths of the moved items, the gaps between items, and the width of the blank between a head and a tail of the item queue. In addition, when there are different item blocks in the view display area, the space between the target item and the current item may further be determined according to the gap between the item blocks. As shown in FIG. 9, in the second and third view display areas, items in one row are classified, and each classification is named as an item block in this example.

FIG. 15 is a schematic diagram illustrating effects achieved according to the method shown in FIG. 14. It should be noted that FIG. 15 is just a schematic diagram representing circling display.

In this example, since data of an item array in the model layer of the UI is formed by connecting two groups of data corresponding to all items in the view display area, when a page is displayed, two groups of items are displayed, and the width of the outer box corresponds to the widths of the two groups of items. The first to third rows in FIG. 15 are respectively diagrams of the display effect when the focus object is item1, item2 or item 3. When an item with index=0, i.e. item1, is to be displayed from the end of a list in a cycling mode, the content of the copied data Data2, is displayed on the screen.

Finally, when the focus object moves to the last item of the original data Data1, as shown in the last row in FIG. 15, if continuing to press the right button, the corresponding focus object will be moved to the first item, and the display result will be reset to the first row in FIG. 15. Similarly, if the left button is pressed when the focus is at the initial position of the first row in FIG. 15, the focus will be moved to the position as shown in the last row in FIG. 15.

That is to say, in this method, the copied data Data2 will never be focused, that is, the focus object will never be any item in the copied Data2. The copied data Data2 is only used as a substitution of a part of the original data Data1 which is moved out of the screen of the display device, and displayed on the screen, so as to achieve a visual circling display effect.

FIG. 15 shows the case where a user presses the right button to move a visual focus towards right. If it is desired to move the visual focus towards left, the display changes in a direction reverse to the arrow in FIG. 15.

Using the method in this example, the data array and thus the DOM tree of the page is not refreshed each time the focus object is switched, such that the lagging phenomenon on the user interface when the focus object is switched may be improved efficiently.

However, according to the above method, the data is copied during the display, which doubles the number of DOM tree of the page and further causes the time for launching the page increase. For example, when a user presses a home button to start the launcher, it takes a long time for the home page interface to launch, which affects user experience. Moreover, as the amount of data increases, a certain amount of cache is being consumed. Based on these factors, the present application provides another scheme.

Figure 16:
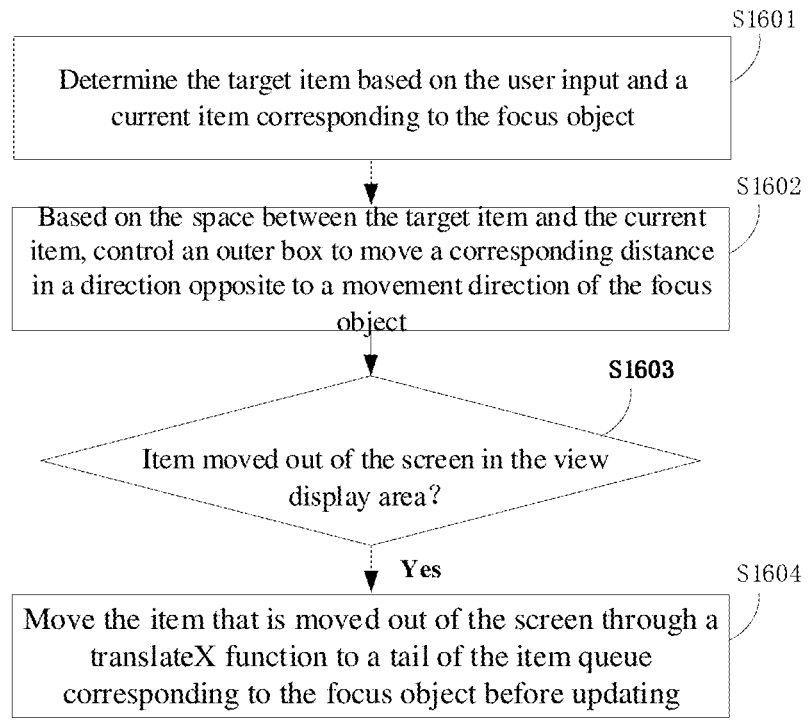
FIG. 16 is yet another schematic flowchart illustrating a method of controlling items in a view display area of a display device to display in a fixed focus cycling mode.

FIG. 16 is yet another schematic flowchart illustrating a method of controlling items in a view display area of a display device 200 to display in a fixed focus cycling mode. As shown in FIG. 16, this method includes the following steps S1601 to S1604.

At S1601, a target item is determined based on a user input and a current item corresponding to the focus object.

For example, the current focus object is a first item in a view display area. If the information input from a user is to move the focus object towards left, the corresponding target item is the last item in the view display area.

At S1602, based on the space between the target item and the current item, an outer box is controlled to move a corresponding distance in a direction opposite to a movement direction of the focus object.

For example, if the item corresponding to the current focus object is the first item and the target item is the eighth item, the focus object is to move towards right by seven items. Accordingly, the distance that the outer box moves towards left is determined according to the space between the first item and the eighth item, as long as the updated target item is ensured to move to the position where the focus object is located.

At S1603, it is determined whether an item needs to move out of the screen in the view display area.

If an item needs to move out of the screen after the focus object is switched, the method goes to step S1604.

At S1604, the item moved out of the screen is moved through a translate-X function to a tail of the item queue corresponding to the focus object before updating.

For example, it is assumed that the item array is Data [{item 1}, {item 2}, {item 3}, . . . , {item n}], when the focus moves from item2 to item3, item1 has moved out of the screen. Furthermore, during the display, according to data including the width of the screen, the display width of each item, and the width of the blank between a head and a tail of the item queue, item1 is moved transversely to the tail of the item queue using the translate-X function with the space between the head and the tail of the item queue retained. The result is shown as the third row in FIG. 17. Each time the focus object is moved, the item just moved out of the screen is moved to the tail of the queue, and the width of the outer box will also be increased correspondingly because the outer box is to place the item, which is moved to the tail, at the tail of the queue, so as to ensure that the display position of the updated focus object on the screen is fixed.

Using the method in this example, the order and the structure of the item array are kept unchanged, whereas the display position of each item is controlled during displaying.

Figure 17:
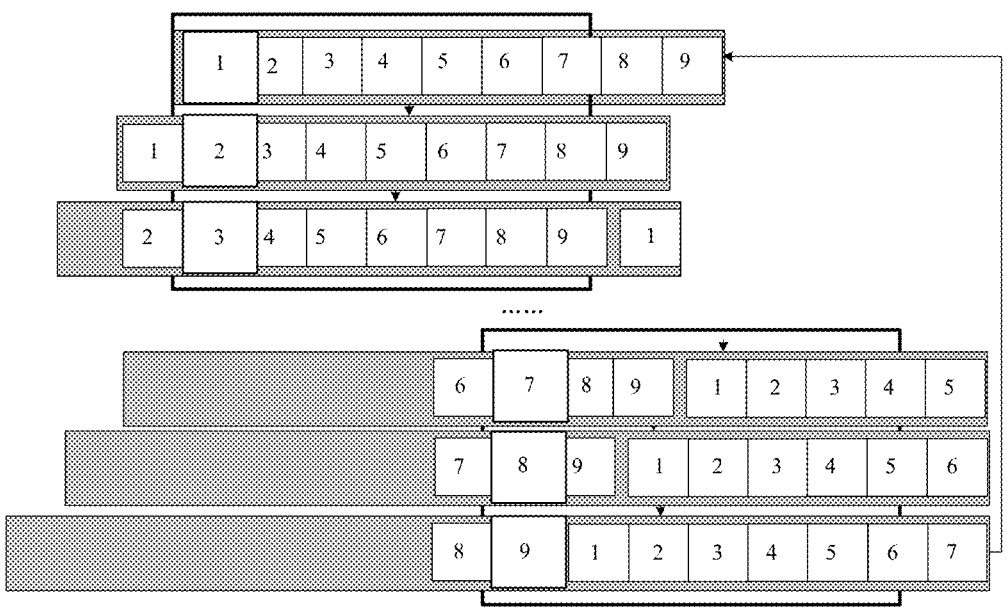
FIG. 17 is a schematic diagram illustrating effects achieved correspondingly according to the method in FIG. 16.

FIG. 17 is a schematic diagram illustrating effects achieved according to the method in FIG. 16. As shown in the second row of FIG. 17, when the focus object is at the position where index=1, that is, the second item, if the focus object moves towards right by one item, the first item with index=0 will be moved out of the screen. As a result, the first item will be moved to the tail of the item queue and the outer box is moved towards left by the width of one item, so that items are totally moved towards left by the width of one item. In the meantime, since the first item is moved to the tail of the item queue, the tail of the outer box will be added a corresponding width, thereby obtaining a display effect as shown in the third row of FIG. 17.

If continuing to move like the above, the outer box continues to move towards left. As the item that is moved out of the screen is added to the tail of the queue, the width of the outer box increases. But it should be noted that the increase of the width of the outer box only leads to the increase in the display area, and no data is added and the animation thereof is also not involved. In this way, the impact on memory and performance may be ignored. In some examples of the present application, as shown in the last row of FIG. 17, when the focus object corresponds to the last item, if a user continues to press the right button, it means that the target focus object corresponds to the first item, and the system identifies that this operation corresponds to left movement of the focus object, thereby returning to the first row in FIG. 17.

FIG. 17 shows the case where the user presses the right button to move a visual focus towards right. If it is desired to move the visual focus towards left, the display changes in a direction opposite to the arrow in FIG. 17.

Using the method in this example, since the changes and the addition of the data in the item array are not involved, the problem that the updating of data causes a page to response slowly, and occupation of memory by increased number of DOM and slow startup resulting from added virtual data may be solved.

In one example, referring to one of FIGS. 9A-9C, there are two item blocks in both of the second and third view display areas, and each item block corresponds to a different title. For the convenience of users, during the cycling display of items, the titles may also follow the item row to display in a cycling mode in this example. It should be noted that when different item blocks are provided in view display areas, during the item display, the spacing between blocks is considered in calculating item position and moving animation according to the item scroll cycling display mode as described above.

Figure 18:
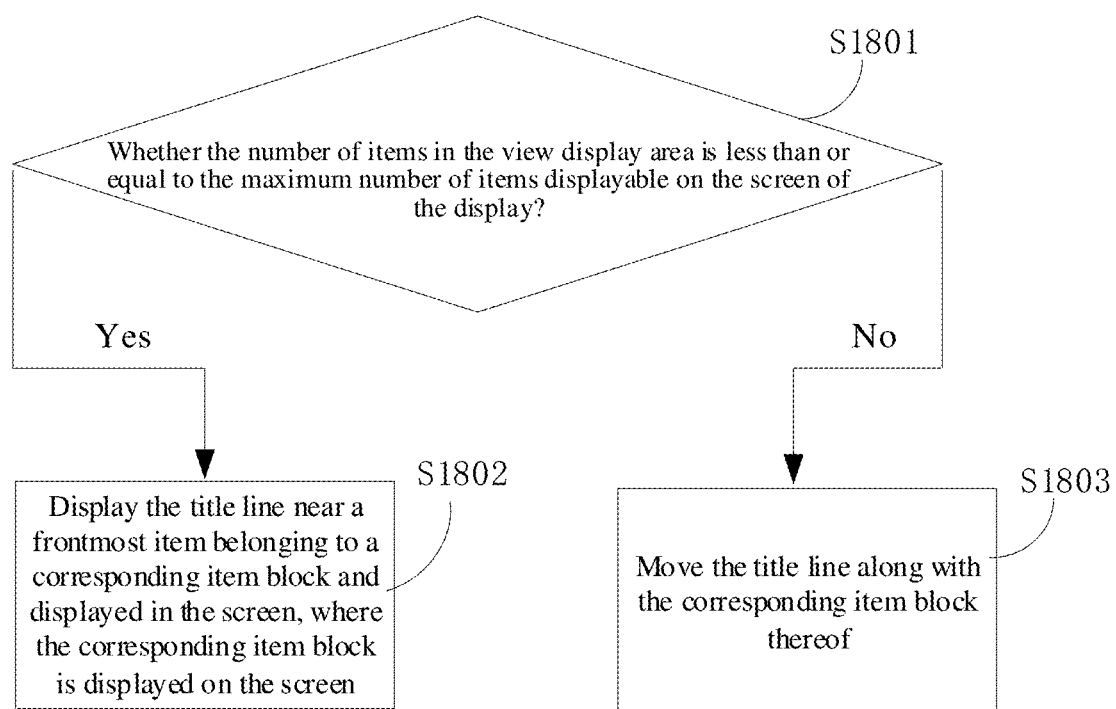
FIG. 18 is a schematic flowchart illustrating a method of controlling a title in a view display area of a display device to display.

FIG. 18 is a schematic flowchart illustrating a method of controlling a title in a view display area of a display device 200 to display. As shown in FIG. 18, the method includes the following steps S1801 to S1803.

At S1801, it is determined whether the number of items in the view display area is less than or equal to the maximum number of items displayable on the screen of the display.

When a user interface is created, if the view display area includes the title line, and the number of items in the view display area is less than or equal to the maximum number of items displayable on the screen, that is, the items in the view display area are displayed in a fixed focus non-cycling mode, the method goes to step S1802, otherwise, the method goes to step S1803.

At S1802, the title line is displayed near a frontmost item belonging to a corresponding item block and displayed on the screen, where the corresponding item block is displayed on the screen.

Figure 19:
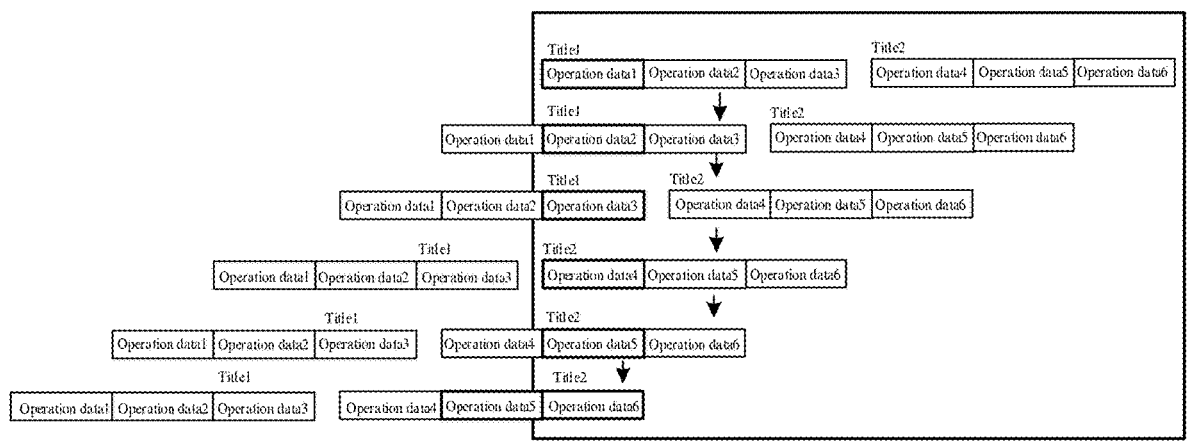
FIG. 19 is a first schematic diagram illustrating effects achieved correspondingly according to the method in FIG. 18.

FIG. 19 is a first schematic diagram illustrating effects achieved according to the method in FIG. 18. As shown in FIG. 19, the view display area is defined to display in the fixed focus non-cycling mode. Both titles are disposed above item blocks that are currently displayed on the screen. The two titles may also be disposed below the item blocks, or any location for identification. When the focus object moves towards right in the presentation state of the first row in FIG. 19, a title 1 does not move, and a title 2 moves by the width of one item along with the focus object, until the first item block is moved out of the screen; and thereafter, when the focus object is switched within the second item block, the title 2 is fixed at the head on the leftmost side of the screen until the second item block is moved out of the screen. In some examples of the present application, in order to facilitate the title above the item block to quickly display on the screen when the item block moved out of the screen is to be re-displayed on the screen, the title of the item block that is moved out of the screen is provided to be nearest to the position of the screen, that is above the left part of the item nearest to the screen.

At S1803, the title line is moved along with the corresponding item block thereof.

For example, the title always moves along with the first item in an item block where the title is, and of course, the title may also move along with other items in the item block. During configuration for animation, since the title line always moves along with the corresponding item block thereof, and an item row is an individual list excluding a title, the animation of the title line is calculated separately in this example.

Figure 20:
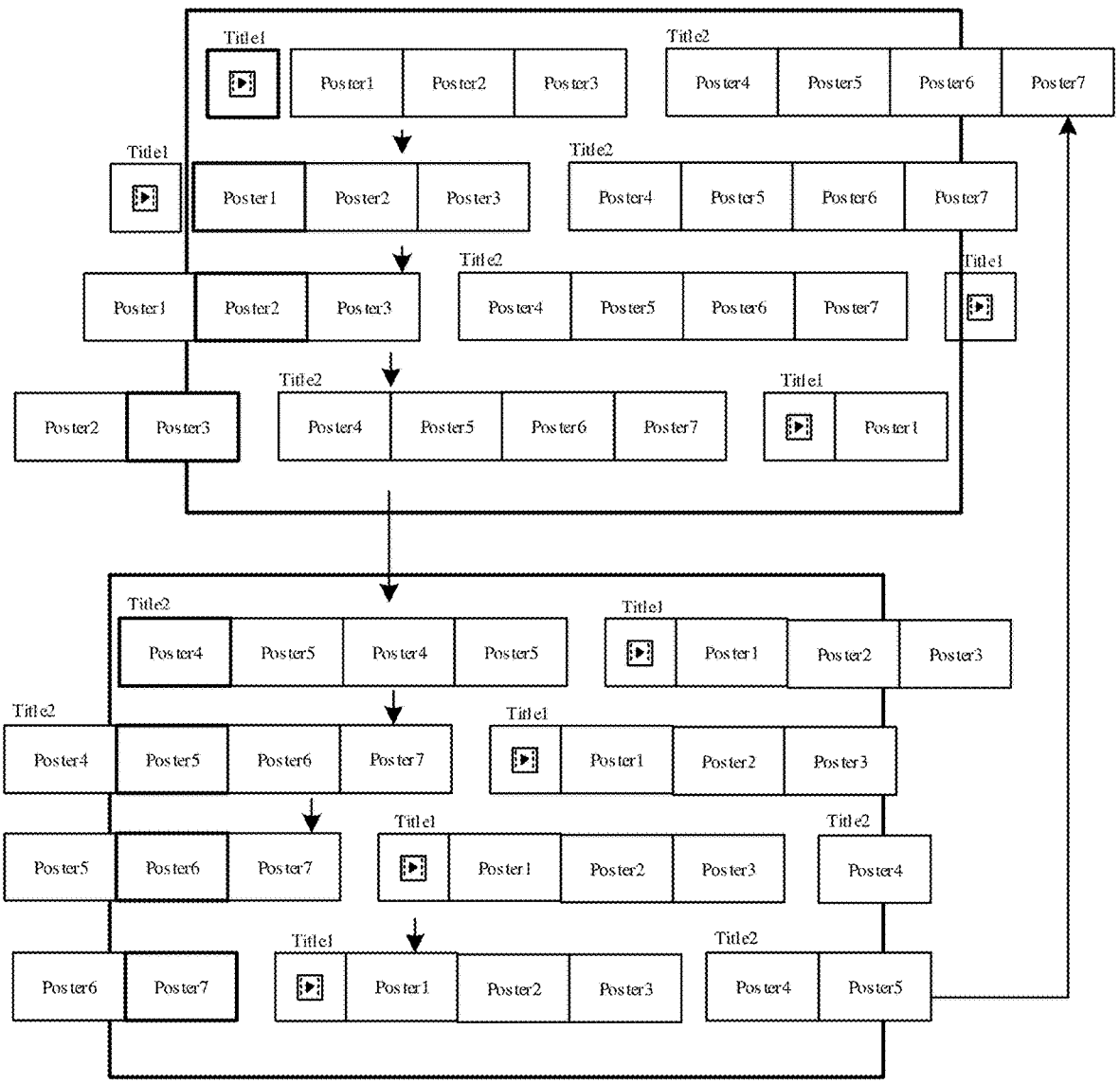
FIG. 20 is a second schematic diagram illustrating effects achieved correspondingly according to the method in FIG. 18.

FIG. 20 is a second schematic diagram illustrating effects achieved according to the method in FIG. 18. As shown in FIG. 20, the view display area is defined to display in the fixed focus cycling mode. When the items are displayed as shown in the first row of FIG. 20, both titles are disposed above item blocks that are currently displayed on the screen. When the items move, the titles are always located above the first item of the corresponding item block, that is, the titles always move along with the corresponding item block.

It should be noted that, when the item row is displayed in the fixed focus cycling mode or the fixed focus non-cycling mode, the title in the title line may be displayed according to the method provided in step S1802, or the method provided in step S1803.

In addition, an example of the present application provides a method of determining specific display rules for an item based on the number of items in a view display area when a user interface is created.

Figure 21:
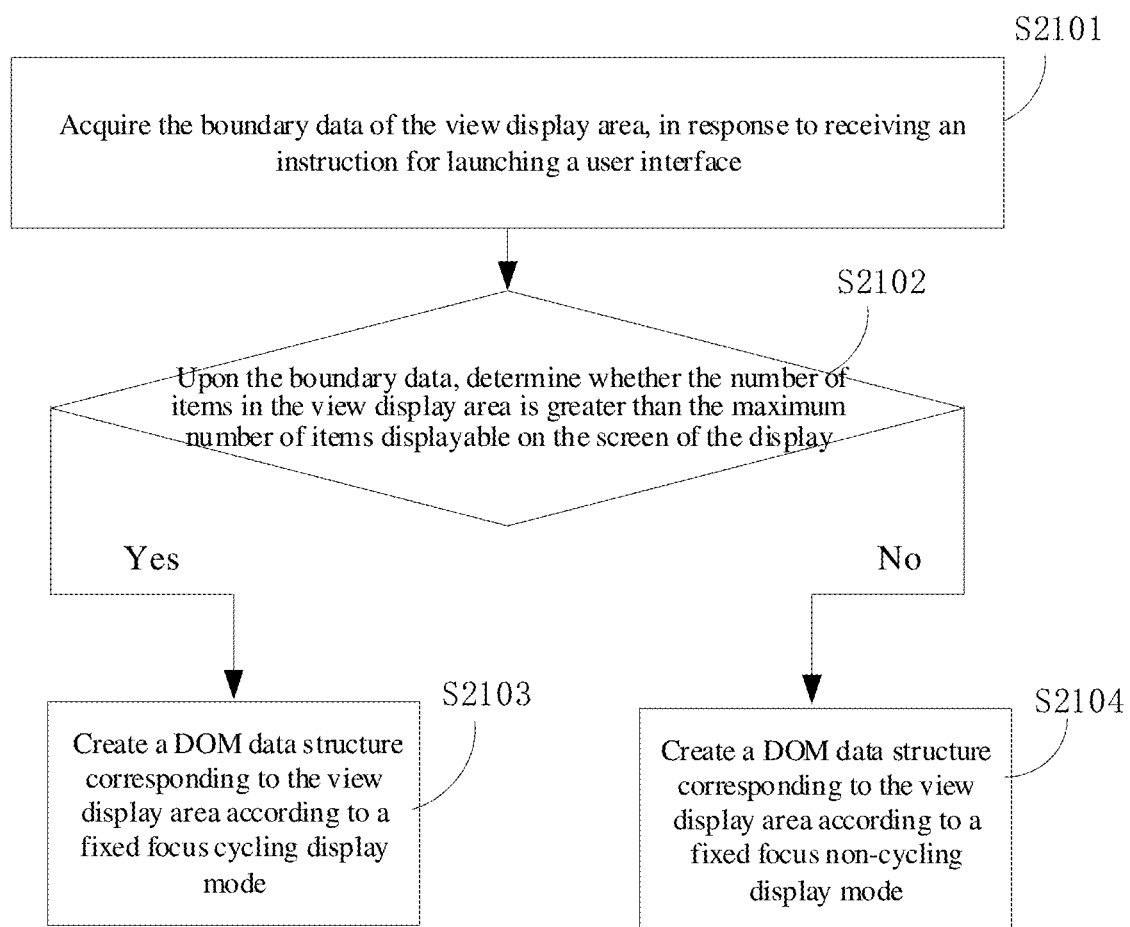
FIG. 21 is a schematic flowchart illustrating a method of determining display mode of items in a display device.

FIG. 21 is a schematic flowchart illustrating a method of determining display rule of items in a display device 200. As shown in FIG. 21, the method includes the following steps S2101 to S2104.

At S2101, in response to receiving an instruction for launching a user interface, boundary data of the view display area is acquired.

The boundary data includes the number of items in the view display area, a display width of each item, a width of the screen, and a predetermined space between adjacent items. It should be noted that in this example, the first and last items in the view display area are defined to be adjacent items, and the width of the blank between these two items is the space between them.

At S2102, based on the boundary data, it is determined whether the number of items in the view display area is greater than the maximum number of items displayable on the screen of the display.

Upon receiving an instruction for starting the launcher from a user by pressing the home button, the number L of items in each view display area, the transverse resolution A of the screen of the display device, the width m of the blank between a head and a tail of the item queue, and the display width I of each item during displaying are obtained respectively at first. When $L>(A-m)/I+1$, that is, when the number of items in the view display area is greater than the maximum number of items displayable on the screen, a first Boolean value e.g., a true value, is returned to a List View component, so as to proceed to step S2103. Otherwise, the number of items in the view display area is less than or equal to the maximum number of items that displayable on the screen, a second Boolean value e.g., a false value, is returned to the List View component, so as to proceed to step S2104. It should be noted that the above formula is obtained by arranging items except for the items at the head and tail of the item queue in a manner of no spacing. In some scenarios, certain modifications may be made on this basis.

At S2103, if the number of items in the view display area is greater than the maximum number of items displayable on the screen of the display, a DOM data structure corresponding to the view display area is created according to the fixed focus cycling display mode.

At S2104, if the number of items in the view display area is less than or equal to the maximum number of items displayable on the screen of the display, a DOM data structure corresponding to the view display area is created according to the fixed focus non-cycling display mode.

According to the above DOM data structure, the List View component renders the page, and the visual user interface is thus successfully launched.

In some examples of the present application, in order to reduce the refresh of the DOM tree, an example of the present application further provides a scheme: it is determined whether the number of items in each view display area, the display width of each item, and the predetermined spacing between items have changed after receiving an instruction for launching the user interface; when the view display area includes a plurality of item blocks, it is further determined whether a space between the item blocks have changed, and if not, the user interface is rendered based on the created DOM data structure.

The above examples mention that: during the use of the display device, the number of items in the view display area is not fixed. The display device is enabled to automatically switch display modes based on the number of items during the use of the display device. For example, the number of items in a view display area is set to be editable by a user; after an item is added or deleted, or data in this area will be updated, if the number of items becomes greater or less than the maximum number of items displayable on the screen, the display mode will be automatically switched.

The data displayed on the page is stored in the model layer of the UI. When the amount of data in the model layer changes, the view layer is notified. The view layer monitors data mount change in the model layer and then calculates the boundary data of the number of items displayable on the screen of the display device. That is, by determining whether the number of items in the view display area is greater than the maximum number of items displayable on the screen of the display device, it is determined which display mode of the items is to be used for the current visual display. For details, reference may be made to steps S2102 to S2104.

In this example, when the focus in the view display area of the user interface is moved, if the number of items in the view display area is greater than the maximum number of items displayable on the screen, the items in the view display area are displayed in the fixed focus cycling mode. That is, as the items move, an item that is moved out of the screen may reappear at the tail of the item queue to realize the circling display of data, thereby facilitating a user to see the content of items in the view display area. When switching the focus object between the head and tail of the queue, a user may quickly select a desired item with less button press, and see the selected item conveniently through the fixed focus display mode. In addition, when the number of items in the view display area is less than or equal to the maximum number of items displayable on the screen, the display is performed in the fixed focus non-cycling mode, which may prevent the problem that the space between the head and tail of the item queue is too large and thus the aesthetics is affected. Therefore, the solution provided by this example may help the user quickly find the desired content while ensuring the visual aesthetics of the user interface, thereby improving user experience.

It should be understood that the terms "first", "second", "third", etc. in the specification and claims as well as the drawings in this application are used to distinguish similar objects, and are not necessarily used to indicate a specific order or a sequential order. It should be understood that the data used in this way may be interchanged as appropriate, so that the examples of the present application described herein can be implemented, for example, in a sequence other than those illustrated herein. The examples of the present application are described in a progressive manner, and the examples may refer to each other.

In addition, the terms "including", "containing" and any variations thereof are intended to cover a non-exclusive inclusion, for example, a product or a device that contains a series of components is not necessarily limited to those components explicitly listed, but may include other components that are not explicitly listed or inherent to the product or the device.

Based on the examples shown in this application, all other examples obtained by a person of ordinary skill in the art without creative efforts shall fall within the protection scope of the present application. In addition, although the disclosure in this application is introduced according to one or more examples, it should be understood that various aspects of the disclosure may also constitute a complete embodiment individually.

The invention claimed is:

1. A display device, comprising:
a display configured to display a user interface, wherein the user interface comprises a plurality of view display areas, each of the view display areas comprises one or more items, and the user interface further comprises a focus object indicating that one of the one or more items is selected;
a memory configured to store computer instructions; and
a processor in communication with the display, and configured to execute the computer instructions to cause the display device to perform:
displaying the user interface on the display, and
upon receiving a user input for moving the focus object in a view display area of the view display areas, moving a target item to a position where the focus object is by:
in response to a number of the one or more items in the view display area being greater than a maximum number of items displayable within a display range of the view display area on a screen of the display, displaying the one or more items in the view display area in a fixed focus cycling mode, and
in response to the number of the one or more items in the view display area being less than or equal to the maximum number of the items displayable within the display range of the view display area on the screen of the display, displaying the one or more items in the view display area in a fixed focus non-cycling mode,
wherein when the processor is configured to execute the computer instructions to cause the display device to perform displaying the one or more items in the view display area in the fixed focus cycling mode, the processor is configured to execute the computer instructions to cause the display device to perform:
based on the user input and a current item corresponding to the focus object, determining whether a first item in the view display area is to be moved out of the screen;
in response to determining that the first item in the view display area is to be moved out of the screen:
moving data corresponding to the first item that is to be moved out of the screen to a tail of an item array in a model layer of the user interface,
refreshing the item array, and
refreshing a view layer of the user interface based on the item array that has been refreshed; and
in response to determining that no item in the view display area is to be moved out of the screen, controlling an outer box to increase a corresponding width in a direction opposite to a movement direction of the focus object, wherein the corresponding width is set based on a requirement of moving the target item to the position where the focus object is.

2. The display device according to claim 1, wherein the processor is further configured to execute the computer instructions to cause the display device to perform:
in response to the view display area including a title line, and the number of the one or more items in the view display area being less than or equal to the maximum number of the items displayable within the display range of the view display area on the screen of the display, displaying the title line near a frontmost item belonging to a corresponding item block and displayed on the screen as the items move according to the user input, and
wherein when a last item belonging to the corresponding item block is to be moved out of the screen, the title is to be moved out of the screen along with the last item.

3. The display device according to claim 1, wherein the processor is further configured to execute the computer instructions to cause the display device to perform:
in response to the view display area including a title line, and the number of the one or more items in the view display area being greater than the maximum number of the items displayable within the display range of the view display area on the screen of the display, moving the title line along with an item block corresponding to the title line.

4. The display device according to claim 1, wherein the processor is further configured to execute the computer instructions to cause the display device to perform:
in response to receiving an instruction for launching the user interface, acquiring boundary data of the view display area, wherein the boundary data includes the number of the one or more items in the view display area, a display width of each of the items, a width of the screen, and a predetermined space between adjacent items;
based on the boundary data, determining whether the number of the one or more items in the view display area is greater than the maximum number of the items displayable within the display range of the view display area on the screen of the display;
in response to determining that the number of the one or more items in the view display area is greater than the maximum number of the items displayable within the display range of the view display area on the screen of the display, creating a document object model (DOM) data structure corresponding to the view display area based on the fixed focus cycling display mode; and in response to determining that the number of the one or more items in the view display area is less than or equal to the maximum number of the items displayable within the display range of the view display area on the screen of the display, creating a DOM data structure corresponding to the view display area based on the fixed focus non-cycling display mode.

5. The display device according to claim 4, wherein the processor is further configured to execute the computer instructions to cause the display device to perform:
in response to receiving the instruction for launching the user interface, determining whether the number of the one or more items in the view display area, the display width of each of the items, and the predetermined space between the adjacent items have changed; and
in response to determining that the number of the one or more items in the view display area, the display width of each of the items, and the predetermined spacing between the adjacent items have not changed, rendering the user interface based on the DOM data structure that has been created.

6. The display device according to claim 5, wherein the processor is further configured to execute the computer instructions to cause the display device to perform:
in response to determining that the number of the one or more items in the view display area, the display width of each of the items, and the predetermined space between the adjacent items have changed, determining whether the number of the one or more items in the view display area is greater than the maximum number of the items displayable within the display range of the view display area on the screen of the display;
in response to determining that the number of the one or more items in the view display area is less than or equal to the maximum number of the items displayable within the display range of the view display area on the screen of the display, creating the DOM data structure corresponding to the view display area based on the fixed focus non-cycling display mode; and
in response to determining that the number of the one or more items in the view display area is greater than the maximum number of the items displayable within the display range of the view display area on the screen of the display, creating the DOM data structure corresponding to the view display area based on the fixed focus cycling display mode.

7. A method for displaying a user interface in a display device, the method comprising:
displaying, by a display device comprising a memory storing instructions and a processor in communication with the memory, the user interface on a display of the display device, wherein the user interface includes a plurality of view display areas, each view display area comprises one or more items, and the user interface further comprises a focus object indicating that one of the one or more items is selected; and
upon receiving a user input for moving the focus object in a view display area of the view display areas, moving, by the display device, a target item to a position where the focus object is by:
in response to a number of the one or more items in the view display area being greater than a maximum number of items displayable within a display range of the view display area on a screen of the display, displaying the one or more items in the view display area in a fixed focus cycling mode, and
in response to the number of the one or more items in the view display area being less than or equal to the maximum number of the items displayable within the display range of the view display area on the screen of the display, displaying the one or more items in the view display area in a fixed focus non-cycling mode,
wherein displaying the one or more items in the view display area in the fixed focus cycling mode comprises:
based on the user input and a current item corresponding to the focus object, determining whether a first item in the view display area is to be moved out of the screen;
in response to determining that the first item in the view display area is to be moved out of the screen:
moving data corresponding to the first item to a tail of an item array in a model layer of the user interface, refreshing the item array, and
refreshing a view layer of the user interface based on the item array that has been refreshed; and
in response to determining that no item in the view display area is to be moved out of the screen, controlling an outer box to increase a corresponding width in a direction opposite to a movement direction of the focus object, wherein the corresponding width is set based on a requirement of moving the target item to the position where the focus object is.

8. The method according to claim 7, further comprising:
in response to the view display area including a title line, and the number of the one or more items in the view display area being less than or equal to the maximum number of the items displayable within the display range of the view display area on the screen of the display, displaying the title line near a frontmost item belonging to a corresponding item block and displayed on the screen as the items move according to the user input, and
wherein when a last item belonging to the corresponding item block is to be moved out of the screen, the title is to be moved out of the screen along with the last item.

9. The method according to claim 7, further comprising:
in response to the view display area including a title line, and the number of the one or more items in the view display area being greater than the maximum number of the items displayable within the display range of the view display area on the screen of the display, moving the title line along with an item block corresponding to the title line.

10. The method according to claim 7, further comprising:
in response to receiving an instruction for launching the user interface, acquiring boundary data of the view display area, wherein the boundary data includes the number of the one or more items in the view display area, a display width of each item, a width of the screen, and a predetermined space between adjacent items;
based on the boundary data, determining whether the number of the one or more items in the view display area is greater than the maximum number of the items displayable within the display range of the view display area on the screen of the display;
in response to determining that the number of the one or more items in the view display area is greater than the maximum number of the items displayable within the display range of the view display area on the screen of the display, creating a document object model (DOM) data structure corresponding to the view display area based on an display mode of the fixed focus cycling mode; and in response to determining that the number of the one or more items in the view display area is less than or equal to the maximum number of the items displayable within the display range of the view display area on the screen of the display, creating a DOM data structure corresponding to the view display area based on an display mode of the fixed focus non-cycling mode.

11. The method according to claim 10, further comprising:

in response to receiving the instruction for launching the user interface, determining whether the number of the one or more items in the view display area, the display width of each item, and the predetermined spacing between the adjacent items have changed; and in response to determining that the number of the one or more items in the view display area, the display width of each item, and the predetermined spacing between the adjacent items have not changed, rendering the user interface based on the DOM data structure that has been created.

12. The method according to claim 11, wherein after determining whether the number of one or more items in the view display area, the display width of each item, and the predetermined spacing between the adjacent items have changed, the method further comprises:

in response to determining that the number of the one or more items in the view display area, the display width of each item, and the predetermined space between the adjacent items have changed, determining whether the number of the one or more items in the view display area is greater than the maximum number of the items displayable within the display range of the view display area on the screen of the display;

in response to determining that the number of the one or more items in the view display area is less than or equal to the maximum number of the items displayable within the display range of the view display area on the screen of the display, creating the DOM data structure corresponding to the view display area based on the display mode of the fixed focus non-cycling mode; and in response to determining that the number of the one or more items in the view display area is greater than the maximum number of the items displayable within the display range of the view display area on the screen of the display, creating the DOM data structure corresponding to the view display area based on the display mode of the fixed focus cycling mode.

13. A non-transitory computer readable storage medium storing computer readable instructions, wherein, the computer readable instructions, when executed by a processor, are configured to cause the processor to perform:

displaying a user interface on a display of a display device, wherein the user interface comprises a plurality of view display areas, each view display area comprises one or more items, and the user interface further comprises a focus object indicating that one of the items is selected; and upon receiving a user input for moving the focus object in a view display area of the view display areas, moving a target item to a position where the focus object is by:

in response to a number of the one or more items in the view display area being greater than a maximum number of items displayable within a display range of the view display area on a screen of the display, displaying the one or more items in the view display area in a fixed focus cycling mode, and in response to the number of the one or more items in the view display area being less than or equal to the maximum number of the items displayable within the display range of the view display area on the screen of the display, displaying the one or more items in the view display area in a fixed focus non-cycling mode, wherein when the processor is configured to execute the computer instructions to cause the display device to perform displaying the one or more items in the view display area in the fixed focus cycling mode, the processor is configured to execute the computer instructions to cause the display device to perform:

based on the user input and a current item corresponding to the focus object, determining whether a first item in the view display area is to be moved out of the screen;

in response to determining that a first item in the view display area is to be moved out of the screen:
moving data corresponding to the first item that is to be moved out of the screen to a tail of an item array in a model layer of the user interface,
refreshing the item array, and
refreshing a view layer of the user interface based on the item array that has been refreshed; and in response to determining that no item in the view display area is to be moved out of the screen, controlling an outer box to increase a corresponding width in a direction opposite to a movement direction of the focus object, wherein the corresponding width is set based on a requirement of moving the target item to the position where the focus object is.

* * * * *